United States Patent
Lachwani et al.

(10) Patent No.: US 9,491,229 B1
(45) Date of Patent: Nov. 8, 2016

(54) APPLICATION EXPERIENCE SHARING SYSTEM

(71) Applicant: Google Inc., Mountain View, CA (US)

(72) Inventors: Manish Lachwani, Sunnyvale, CA (US); Jay Srinivasan, San Francisco, CA (US); Raymond Tonsing, San Francisco, CA (US)

(73) Assignee: Google Inc., Mountain View, CA (US)

( * ) Notice: Subject to any disclaimer, the term of this patent is extended or adjusted under 35 U.S.C. 154(b) by 535 days.

(21) Appl. No.: 14/163,961

(22) Filed: Jan. 24, 2014

(51) Int. Cl.
| | |
|---|---|
| *G06F 7/00* | (2006.01) |
| *H04L 29/08* | (2006.01) |
| *G06F 3/0484* | (2013.01) |
| *G06F 9/445* | (2006.01) |
| *G06Q 30/02* | (2012.01) |

(52) U.S. Cl.
CPC ............. *H04L 67/10* (2013.01); *G06F 3/0484* (2013.01); *G06F 8/61* (2013.01); *G06Q 30/0283* (2013.01)

(58) Field of Classification Search
CPC ........... G06Q 20/206; G06Q 20/3821; G06Q 10/06; G06Q 10/10; G06Q 10/107
USPC ........................................................ 235/376
See application file for complete search history.

(56) References Cited

U.S. PATENT DOCUMENTS

| | | | |
|---|---|---|---|
| 4,953,084 A | 8/1990 | Meloy et al. | |
| 6,131,188 A | 10/2000 | Goebel | |
| 6,145,122 A | 11/2000 | Miller et al. | |
| 6,151,701 A | 11/2000 | Humphreys et al. | |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,370,810 B2 | 2/2013 | Oda | |
| 8,479,166 B2 | 7/2013 | Nir-Buchbinder et al. | |
| 8,504,987 B2 | 8/2013 | Li et al. | |
| 8,671,080 B1 | 3/2014 | Upadhyay et al. | |
| 9,021,443 B1 * | 4/2015 | Lachwani ........... G06F 11/3664 717/124 |
| 2002/0010710 A1 | 1/2002 | Binnig | |

(Continued)

OTHER PUBLICATIONS

Pyzocha, "Non Final Office Action dated Sep. 9, 2014", U.S. Appl. No. 13/655,667, The United States Patent and Trademark Office, Sep. 9, 2014.

(Continued)

*Primary Examiner* — Seung Lee
(74) *Attorney, Agent, or Firm* — McDonnell Boehnen Hulbert & Berghoff LLP

(57) ABSTRACT

Described herein is a system generating and sending shortcuts from a sending device to a receiving device. In one implementation, the sending device generates shortcut reference data (SRD) which includes application data indicative of a state of an application and a hash based on the application data. The SRD is sent to a shortcut server, while shortcut delivered data (SDD) which includes the hash value is sent to a recipient device. The recipient device may use the hash value of the SDD to request and receive the application data from the shortcut server. Once received, an application installed on the recipient device recreates on the recipient device the state of the application as originally presented on the sending device. As a result, a user at the sending device may share their experience with a user at the receiving device. Fees associated with the use of the system may be calculated.

20 Claims, 18 Drawing Sheets

(56) References Cited

U.S. PATENT DOCUMENTS

| | | | |
|---|---|---|---|
| 2002/0040470 | A1 | 4/2002 | Guthrie et al. |
| 2002/0166081 | A1 | 11/2002 | Richardson et al. |
| 2003/0221184 | A1 | 11/2003 | Gunjal et al. |
| 2004/0194072 | A1 | 9/2004 | Venter |
| 2005/0273776 | A1 | 12/2005 | Guilford |
| 2005/0278707 | A1 | 12/2005 | Guilford |
| 2006/0059253 | A1 | 3/2006 | Goodman et al. |
| 2006/0242709 | A1 | 10/2006 | Seinfeld et al. |
| 2007/0288644 | A1 | 12/2007 | Rojas et al. |
| 2009/0150420 | A1 | 6/2009 | Towner |
| 2009/0150574 | A1* | 6/2009 | Kawahara ............ G06F 3/0482 710/18 |
| 2011/0047597 | A1 | 2/2011 | Mahaffey et al. |
| 2011/0289483 | A1 | 11/2011 | Williams et al. |
| 2012/0260344 | A1 | 10/2012 | Maor et al. |
| 2013/0060890 | A1 | 3/2013 | Lee et al. |
| 2013/0152047 | A1 | 6/2013 | Moorthi et al. |
| 2013/0185798 | A1 | 7/2013 | Saunders et al. |
| 2013/0227636 | A1 | 8/2013 | Bettini et al. |
| 2013/0276061 | A1 | 10/2013 | Chebiyyam et al. |
| 2013/0282892 | A1 | 10/2013 | Levi et al. |
| 2014/0020096 | A1 | 1/2014 | Khan et al. |
| 2014/0082729 | A1 | 3/2014 | Shim et al. |
| 2014/0172856 | A1* | 6/2014 | Imbruce ............... G06F 17/212 707/737 |
| 2015/0371201 | A1* | 12/2015 | Read .................... G06Q 20/322 705/39 |

OTHER PUBLICATIONS

Seo, et al., "Analysis on maliciousness for mobile applications", 2012 Sixth International Conference on Innovative Mobile and Internet Services in Ubiquitous Computing, IEEE, 2012, pp. 126-129.

Pyzocha, "Non Final Office Action dated May 13, 2014", U.S. Appl. No. 13/655,667, The United States Patent and Trademark Office, May 13, 2014.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

"Debugserver", [online] [retrieved on Apr. 22, 2014] Retrieved from the Internet: <http://iphonedevwiki.net/index.php/Debugserver>.

Chowdhury, "Non Final Office Action dated Feb. 13, 2014", U.S. Appl. No. 13/631,919, The United States Patent and Trademark Office, Feb. 13, 2014.

lldb.llvm.org, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited-Blog about Java programming language, Fix Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

* cited by examiner

SHORTCUT DATA 130

| SENDER IDENTIFIER 602 | HASH DATA 114 | APPLICATION DATA 112 | LINK DATA 118 | LOG DATA 116 |
|---|---|---|---|---|
| 102(1) | PL2Gb98z | Flight_1_ID:32491,Rate_Sched:00a3;Flight_2_ID:00199,... | http://distributor.com/apps/PL2G | none |
| 102(2) | FLYMAA91 | 129381.png | http://distributor.com/apps/MANG | 696620796f75206361 6e2072 65616420746 86973 |
| 102(2) | PL2G83AQ | Flight_1_ID:99874,Rate_Sched:00p1;Flight_2_ID:87654,... | http://distributor.com/apps/PL2G | none |
| 102(1) | BOBOLMMN | 8656c6c6f20776f726c64 | http://distributor2.com/apps/BOBO | none |
| ... | | | | |

FIG. 6

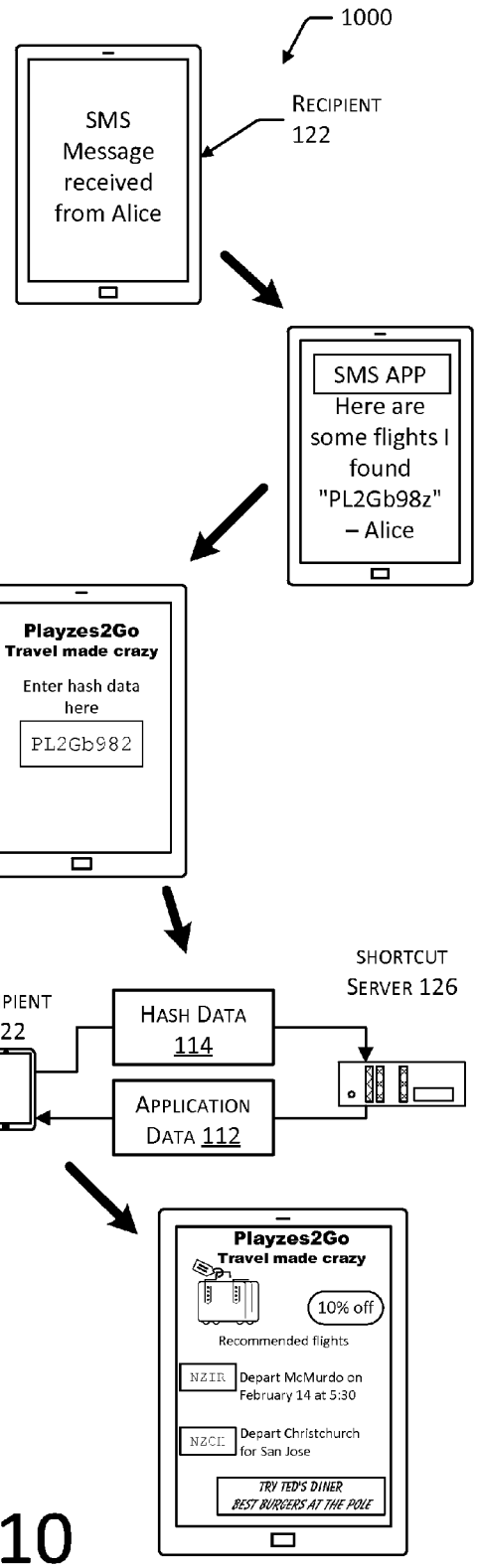

1002 RECEIVE MESSAGE INCLUDING SHORTCUT DELIVERED DATA COMPRISING HASH DATA

1004 PRESENT THE HASH DATA WITH A FIRST USER INTERFACE OF A FIRST APPLICATION

1006 RECEIVE THE HASH DATA WITH A SECOND USER INTERFACE OF A SECOND APPLICATION

1008 RECEIVE APPLICATION DATA ASSOCIATED WITH THE HASH DATA FROM A SHORTCUT SERVER

1010 CONFIGURE THE SECOND APPLICATION USING THE APPLICATION DATA

FIG. 10

APPLICATION EXPERIENCE SHARING SYSTEM

BACKGROUND

A wide variety of data is accessible using the internet or other networked systems. Organizations and individuals use the data for entertainment, commerce, education, communication, and so forth. One of the many advantages in having data available online is the prospect of one user sharing that data with another user.

BRIEF DESCRIPTION OF THE DRAWINGS

FIG. 6 depicts a block diagram of shortcut data as stored by the shortcut server.

FIG. 10 depicts a flow diagram of sharing an application experience from a sending computing device to a receiving computing device using a manual input of hash data by a recipient user to an application module.

Figure 1:
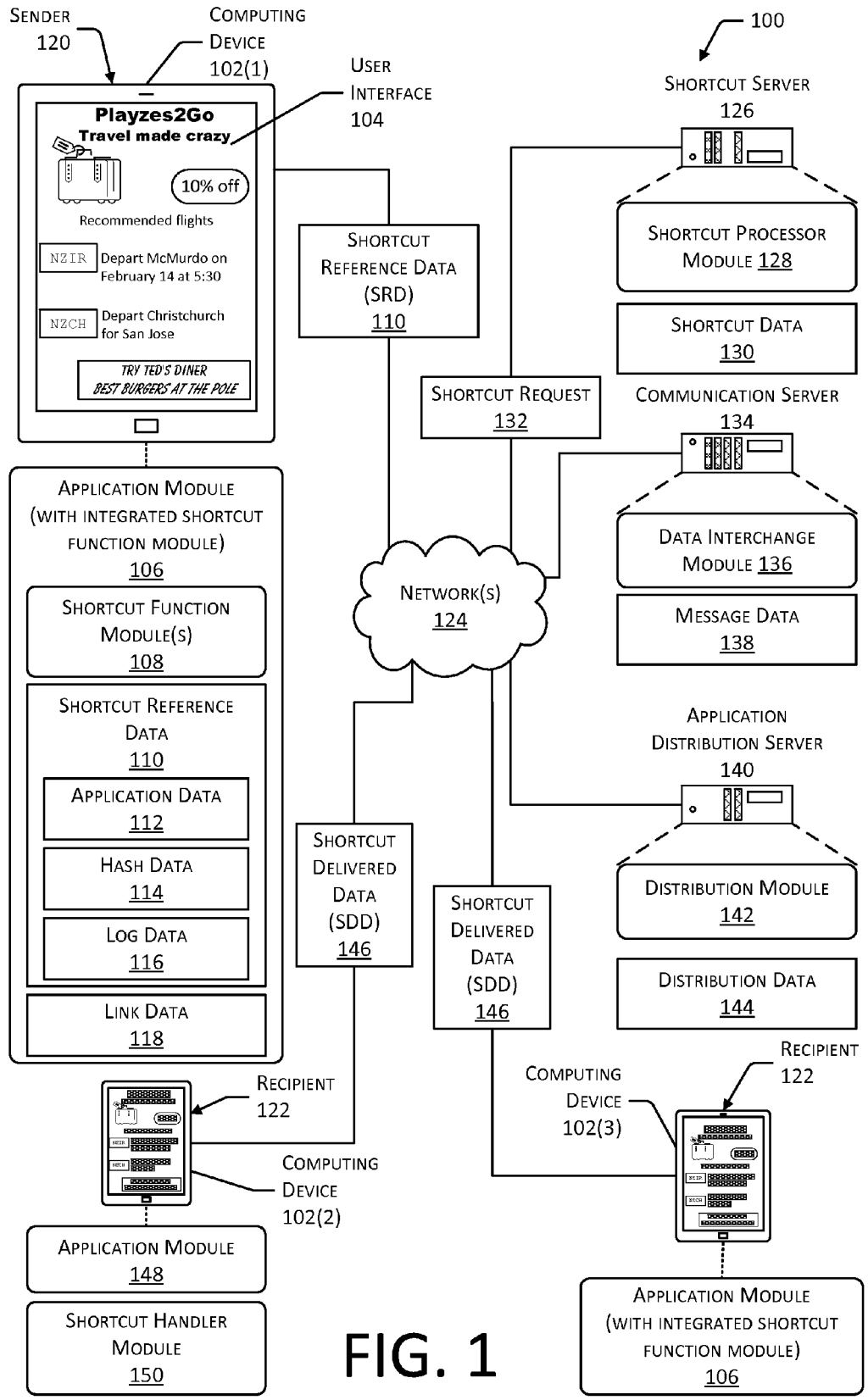
FIG. 1 depicts an illustrative application experience sharing system in which a sending computing device shares an application experience with a recipient computing device using shortcut reference data (SRD), shortcut delivered data (SDD), and so forth.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Increasingly, users access data with computing devices which are portable or mobile. The computing devices may include tablets, smartphones, wearable computers, in-vehicle computers, and so forth. Application modules (or "apps") may execute at least in part on these computing devices to provide the user with access to data. For example, an application module may provide a user interface which allows the user to access travel information.

As computing capabilities grow, both on the computing device and on servers and other devices which support data access, the richness of data which is accessible to the user and which the user may interact with also grows. For example, using a smartphone a user may engage in a complete set of transactions ranging from research about a vacation to booking flights, reserving accommodations, making dinner reservations, and so forth using one or more application modules.

As rich as these capabilities are, until now there has been a significant limitations in sharing application experiences with other users. An application experience is the particular point in an interaction of the application module and corresponding backend systems such as data servers. The application experience may include a particular image of a user interface as presented on a display, particular audio being presented by speakers, and so forth. Continuing the above example, the application experience may comprise a user interface showing several flights which have been painstakingly selected by the user after navigating through several searches, setting different options, and so forth. In another example, the application experience may be information presented in a user interface resulting from a process which is not directed by a user, such as after selecting a "surprise me" or "random pick" option. Regardless of how the particular application experience has been arrived at, the user may wish to store that application experience for later use, to share with another user or group of users, and so forth. Continuing the earlier example, the user may wish to share the application experience containing the information about flights with other users. Furthermore, they may wish to share this application experience without the effort involved in signing into an account, saving the itinerary, navigating a user interface to select who to send the itinerary to, and so forth. Additionally, the user may find it desirable to share the application experience such that the recipient has the same (or very similar) application experience. This may enable the sending user and the recipient user to more easily communicate with one another about the information presented in the application experience, as they are literally "starting on the same page" with respect to what they are experiencing with the respective application modules executing on the respective computing devices.

The application experience may be expressed in some implementations as state data which is associated with the application module at that particular point. For example, the application experience may be thought of as a "snapshot" or "capture" of the application module. The application experience may be the result of several specific interactions, serendipity, or a combination thereof. The application experience may include variable or changeable content, such as advertisements, banners, and so forth.

Traditionally, limited sharing of information has been possible by using uniform resource locator (URL)-based bookmarks. However, URL bookmarks may become quite long making them unsuitable for easy transmission, manual entry, verbal distribution, and so forth. For example, a user may have significant difficulty is manually entering a URL such as the following which includes 149 characters:

"http://www.example.com/site/kphone-vanish-4g-cell-phone/6634985.p?id=
1218769043479&skuId=6634985&st=android phone&cp=1&lp=3&contract_desc=#tab=reviews"

Shortened URL services partially alleviate length issues associated with an end application experience, but may introduce other problems such as: linkrot, abuse by spammers or other illicit parties, reference to an underlying full-length URL with the associated drawbacks, and so forth. Furthermore URLs are subject to several underlying issues which limit the ability for a URL to effectively convey the application experience. In one example, the use of URL bookmarks is limited to sharing information between web browsers, or applications which are able to parse the URL. In another example, URL bookmarks do not support sufficient information to provide for high-fidelity sharing of the application experience. URL lengths may be constrained by various specifications, maximum character lengths, restrictions on which characters may be used, restrictions on where a particular character or combination of characters may be used, web browser engine capability, server capability, and so forth. For these and other reasons, URLs are thus unable to provide for the storage and sharing of an application experience across application modules which execute as native applications, markup language applications, hybrid applications, or browser based applications.

Described in this disclosure are systems and techniques which support storage and distribution of an application experience between computing devices using shortcuts generated and processed by shortcut function modules. At compile time, such as when an application is compiled into an executable form by a compiler application, an application module is configured to incorporate or include static links to shortcut function module libraries. For example, the shortcut function modules may be provided as a software development kit (SDK) for use by software developers. The shortcut function modules provide functions which may be called by the application module. These functions may include one or more of creating a shortcut, sharing a shortcut, retrieving a shortcut, preventing duplicate shortcuts, generating hash values, adding information to an existing shortcut, and so forth as described below in more detail. By integrating the shortcut function modules at compilation time of the application module executable, the functions are available for use by the application module in situations where security constraints in an operating system restrict exchange of data between the application module and other application modules. In other implementations where the operating system permits exchange of data between application modules, a shortcut handler module which is separate from the application module may operate to process shortcuts.

The application module or the shortcut handler module may generate shortcuts. The generation of the shortcuts may be automatic, initiated by the user, or a combination thereof. Generation of a shortcut includes the acquisition of application data associated with the application module. The developer(s) of the application module may define the contents of the application data. This allows for maximum flexibility on the part of the developer. The application data may include state data, screenshots, or other information. For example, the state data may comprise: a device identifier, a user identifier, geographic location data, date and time, query terms, datastore referents, user interface settings, communication state information, and so forth. The state data is information associated with the application module contemporaneous to a point in time at which the shortcut is generated. In some implementations the state data may be the application module state prior to the point in time at which the shortcut is generated. For example, the state a few seconds earlier. The state data may be retrieved from the application module, the operating system under which the application module is executing, or both.

In some implementations log data may also be included when generating the shortcut. The log data may include current state of UIView classes, UIWebview classes, network data, and so forth. The log data may be continuously or periodically acquired prior to generation of the shortcut, such that information leading up to the point in time of the shortcut generation may be captured. Recipients providing technical support or assistance to the sender may use the log data to aid in troubleshooting. For example, a user at a sending computing device may generate a shortcut after encountering a problem. The support engineer receiving the shortcut may use the application data and the log data to attempt to troubleshoot the problem.

Hash data may be used to identify a particular shortcut or application experience. The hash data may include an application identifier which indicates a particular application module which generated the shortcut and a hash value. The hash value is generated by applying using at least a portion of the application data as input to a hashing function. For example, the device identifier, state data, date, time, and so forth may be used as an input to generate the hash value. In some implementations the hashing function may be configured to produce a hash value with a maximum length, or which is limited to include particular characters. For example, the hashing function may be configured to produce hash values which only include letters or numbers, omit special characters or punctuation marks, and have a maximum length of four characters.

A sending device comprising a first computing device which generates a shortcut is configured to send shortcut reference data (SRD) to a shortcut server. The SRD comprises application data, and may include hash data, log data, or other data. In implementations where the SRD omits the hash data, the shortcut server may be configured to generate the hash data.

The sending device, or another device such as the shortcut server, may then send shortcut delivered data (SDD) to a recipient device comprising a second computing device. In some implementations, the SDD may be sent to the same computing device, but provided to a different account logged into that same computing device. The SDD comprises hash data and may include link data. The hash data provide information which is indicative of the application module associated with the shortcut, while the hash value uniquely identifies a particular application experience or shortcut. The link data may include a uniform resource identifier (URI) which may be used to initiate installation of the application module, should the recipient device not have the application module installed.

The recipient device receives the SDD. Based on the hash data, such as the application identifier therein, a particular application module associated with that application identifier is provided with the hash value. In some implementations, this may include a manual operation, such as presenting the hash data to the user for manual input to the corresponding application module. In other implementations, the SDD or a portion of the information therein may be provided automatically to the particular application module.

The application module on the recipient device uses the shortcut function modules to retrieve the application data from the shortcut server which is associated with the hash data. For example, the application module may provide the shortcut server with the hash data, and the shortcut server may return the application data to the recipient device. As with the generation of the application data, the developer of the application module defines the use of the application data.

In some situations the recipient device may lack the application module associated with the SDD. For example, the sending device may have the application module for the application "Playzes2Go" installed while the recipient device may not. The recipient device may initiate installation using the information provided in the link data. Continuing the example, the user may select or activate a URI in the link data to open an application store application which is configured to distribute the "Playzes2Go" application module to the recipient device. Once installed, the application module may use the shortcut function modules to retrieve the application data using the hash data. Once retrieved, the application data may be used to recreate the application experience of the sending device.

The application experience sharing system may be configured to receive remuneration for providing the functionality described in this disclosure. In one implementation the system may assess a fee for each application module distribution which is attributed to a shortcut. For example, an application distributor may be charged $1 for each application module which was referred to the application store by the link data in the SDD. In another implementation the system may assess a fee based on a percentage of sales associated with use of the application data. Continuing the earlier travel example, a percentage of the sales associated with the travel itinerary as booked which is associated with the shortcut may be assessed. In another implementation, the system may assess a fee based on each retrieval of application data from the shortcut server. For example, $0.05 may be billed each time the application data is sent to a recipient device. In still another implementation, the system may assess a fee based on each access to the application data, including access to application data which has been previously transferred by the shortcut server and is stored within a cache on the recipient device. Finally, a combination of fees including those described above, or other fees may also be assessed.

Use of the system described in this disclosure improves application experiences while interaction with application modules by enabling robust storage and sharing of application experiences. Users may send application experiences to one another using the shortcuts described herein. This improves collaboration by allowing different users to start "on the same page". Furthermore, the application developers may easily integrate the shortcut functionality into existing applications while retaining control as to what application data to send, how to format the application data, and so forth.

Additionally, use of the system may improve distribution of application modules to computing devices which have not previously installed the application module. For example, as senders send shortcuts to recipients, the functionality provided by the link data provides a "low-friction" path to begin application installation. As a result, more application modules may be distributed compared to traditional systems. Finally, overall sales associated with the application modules may be increased as users are more easily able to collaborate and share application experiences.

Illustrative Environment

FIG. 1 depicts an illustrative application experience sharing system 100. The system includes one or more computing devices 102(1), 102(2), 102(3), . . . , 102(U). As used in this disclosure, letters enclosed in parentheses such as "(U)" indicate an integer value of zero or greater, unless otherwise indicated. The computing device 102 may comprise a tablet computer, wearable computing device, smart phone, media player device, in-vehicle computing system, embedded device, and so forth. In some implementations the computing device 102 may be portable or transportable from one physical location to another, such as in the case of a tablet computer or wearable computing device. In other implementations the computing device 102 may be fixed in one physical location, such as in the case of a computing device embedded within a refrigerator.

The computing device 102 may be configured to provide a user interface 104. The user interface 104 may include one or more of a graphical user interface (GUI), character user interface (CUI), audible user interface, or haptic user interface. In particular, an application module 106 may provide information which is used by another module executing on the computing device 102, such as an operating system module, to provide the user interface 104.

The application module 106 may be configured to provide one or more functions including but not limited to data retrieval, data storage, data processing, and so forth. For example, the application module 106 may be configured to provide a user interface 104 which allows the user to access information about airline travel, hotels, and so forth. In another example, the application module 106 may be configured to present content such as audio, video, webpages, and so forth. The application module 106 may be colloquially known as an "app".

The computing device 102 may store and execute, at least in part, the application module 106. For example the application module 106 may include one or more server-side components in which at least a portion of the application module 106 functionality executes on a remote computing device. In another example, the application module 106 or portions thereof may be stored on external storage devices, such as a remote storage server, distributed across another computing device 102, and so forth. The computing device 102 may store, execute, or store and execute a plurality of application modules 106. The plurality of application modules 106 may be provided or developed by a plurality of entities. For example, application module 106(1) may be produced by "Alpha Corp." while application module 106(2) may be produced by "Beta Inc.".

The application module 106 as illustrated here integrates one or more shortcut function modules 108. The shortcut function modules 108 may be integrated with the application module 106 during compiling of an executable. The shortcut function modules 108 may include one or more libraries. The integration is discussed in more detail below with regard to FIG. 3, and elsewhere in the disclosure.

The shortcut function module 108 provides functionality associated with sharing an application experience by way of a shortcut. The application 106 may call on the functions provided to perform one or more operations including but not limited to: creating a shortcut, sharing a shortcut, retrieving a shortcut, adding to a shortcut, deleting a shortcut, and so forth. Details about these operations are discussed in more detail elsewhere in the disclosure.

The system 100 described in this disclosure provides a mechanism by which an application experience, or a portion thereof, may be expressed by a shortcut which may be stored for later use or shared with others. In some implementations, the application experience may be considered a particular point in an interaction of the application module 106 and corresponding backend systems such as data servers. The application experience may include a particular image of the user interface 104 as presented on a display, a particular portion of audio being presented by speakers, and so forth.

The shortcut function module 108 may be configured to generate shortcut reference data (SRD) 110. The SRD 110 may include one or more of application data 112, hash data 114, log data 116, or other data.

The application data 112 may include state data, screenshots, or other information. The application data 112 may be processed by an application module 106 executing on a recipient computing device 102 to configure the recipient computing device 102 to re-create (or closely approximate) the state of the application module 106 at the time the shortcut was generated. The application data 112 is discussed in more detail below with regard to FIG. 2, as well as elsewhere in this disclosure.

The hash data 114 may be used to identify a particular shortcut, distinguishing one shortcut from another. The hash data 114 may include an application identifier which indicates a particular application module 106 which generated the shortcut and a hash value. The hash value is generated by applying a hashing function to at least a portion of the application data 112. For example, a device identifier, state data, date, time, and so forth may be used as input to generate the hash value. The hash data 114 is discussed in more detail below with regard to FIG. 2, as well as elsewhere in this disclosure.

In some implementations the hashing function may be configured to produce a hash value with a maximum length, which is limited to include particular characters, involves a particular arrangement of those particular characters, and so forth. For example, the hashing function may be configured to produce hash values which only include letters or numbers, omits special characters or punctuation marks, forms mnemonic constructs, and so forth.

In some implementations, the log data 116 may be included in the SRD 110. The log data 116 may include current state of UIView classes, UIWebview classes, network data, information from an operating system console, and so forth. The log data 116 is described in more detail below with regard to FIG. 2, as well as elsewhere in the disclosure. The log data 116 may be used in situations where the recipient is attempting to debug or troubleshoot a problem encountered by the computing device 102 generating the shortcut.

In some implementations, the shortcut function module 108 may provide link data 118. The link data 118 may include a uniform resource identifier (URI). Should the shortcut be provided to a computing device 102 which lacks a compatible application module 106, the link data 118 may be used to initiate installation of the application module 106. For example, the link data 118 may include a URI which invokes an application store application module at a predetermined address from which the application module 106 may be obtained from an application store service. In another example, the link data 118 may comprise a script or other information configured to install the application module 106 which has been previously stored in the memory of, but not installed on, the computing device 102. The link data 118 is described in more detail below with regard to FIG. 2, as well as elsewhere in the disclosure.

For ease of illustration, not necessarily as a limitation, the computing device 102 which generates SRD 110 may be known as a "sender" 120. Similarly, the computing device 102 which receives a shortcut may be known as a "recipient" 122. In some implementations, the sender 120 and the recipient 122 may be the same computing device 102. For example, a first user may be logged into the computing device 102 using a first user account and may generate SRD 110 corresponding to a shortcut. Continuing the example, a second user may then log into the computing device 102 using a second user account and access the shortcut.

The shortcut function modules 108 of the sender 120 may be configured to generate the SRD 110 automatically, upon user input, or both. For example, the SRD 110 may be generated at periodic time intervals, upon occurrence of particular events within the application module 106, and so forth. In another example, the SRD 110 may be generated upon activation by a user control, such as a virtual button presented on a touchscreen device. Continuing this example, the button may be provided in the user interface 104.

The computing devices 102 may be configured to connect to one or more networks 124. The one or more networks 124 may comprise public networks, private networks, or combinations thereof such as the Internet. For example, the public network may comprise a cellular data network, while the private network comprises a local area network. A shortcut server 126 may also connect to the one or more networks 124, such that the computing devices 102 may communicate with the shortcut server 126.

The shortcut server 126 may include a shortcut processor module 128. The shortcut server 126 may also store, or have access to, shortcut data 130. The shortcut processor module 128 is configured to receive SRD 110 as provided by the sender 120. Once received, the SRD 110 or a portion thereof is stored within the shortcut data 130. The shortcut data 130 may include information indicative of the sender 120, the hash data 114, the application data 112 associated with the hash data 114, log data 116 (if provided), link data 118, and so forth. The shortcut data 130 is discussed in more detail below with regard to FIG. 6 and elsewhere in this disclosure.

The shortcut processor module 128 is also configured to respond to shortcut requests 132. As described elsewhere in more detail, the recipient 122 may send a shortcut request 132 to the shortcut server 126. The shortcut request 132 may include the hash data 114. Based at least in part on the hash data 114, the shortcut processor module 128 may be configured to retrieve corresponding application data 112 from the shortcut data 130. The shortcut processor module 128 may perform other operations, as described elsewhere in this application.

The computing devices 102 may communicate with one another by way of the network 124. For example, the computing devices 102(1) and 102(2) may have established a peer to peer local area network by way of a wireless networking interface, such as Wi-Fi® or Bluetooth®.

In some situations, the computing devices 102 may use an intermediary, such as a communication server 134 to communicate. For example, the communication server 134 may be provided by a telecommunication carrier and may be configured to provide short message service (SMS) to the computing devices 102 by way of a wireless cellular communication network. In another example, the communication server 134 may comprise an instant messaging server, email server, file transfer service, and so forth operated by a network service provider. In still another example, the communication server 134 may comprise a web service such as a social media website, social networking website, and so forth. The communication server 134 may include a data interchange module 136. The data interchange module 136 is configured to exchange information between the computing devices 102. Continuing the example above, the data interchange module 136 may be configured to accept an SMS message from the computing device 102(1) and deliver the SMS message to the computing device 102(2) by way of the wireless cellular communication network. The data interchange module 136 may store message data 138. The message data 138 comprises information associated with the transfer of data. For example, the message data 138 may include a sender identifier, recipient identifier, billing information, message contents, and so forth.

An application distribution server 140 may also connect to the network 124, and may thus be in communication with the computing device 102. The application distribution server 140 may execute a distribution module 142 configured to provide the application module 106 to the computing device 102. For example, the distribution module 142 may receive an application installation request and may distribute the application module 106 to a computing device 102. In one implementation, the distribution module 142 may be a portion of an application store operated by a merchant. Users may access the application store by way of the computing devices 102. The application distribution server 140 may maintain distribution data 144. The distribution data 144 may include a recipient identifier indicative of a user account or computing device 102 which received the application module 106, information associated with the request for distribution, and so forth. For example, the distribution data 144 may include the hash data 114 associated with a request for distribution of the application module 106 from a computing device 102 which requested installation of the application module 106.

The sender 120 may send shortcut delivered data (SDD) 146 to the recipient 122. As described above, the sender 120 may communicate the SDD 146 to the recipient 122. The communication may be by way of the network 124 and may include direct communication such as in the case of a peer-to-peer connection between the computing devices 102(1) and 102(2), or by way of an intermediary device such as the communication server 134. For example, the sender 120 may send the SDD 146 to the recipient 122 using a Bluetooth connection. In another example, the sender 120 may send the SDD 146 to the recipient 122 as an SMS, instant message, posting to social networking website, and so forth.

The SDD 146 comprises the hash data 114, and in some implementations may include the link data 118. The recipient 122 processes the SDD 146. In a first implementation, the processing may be performed by the application module 106 as described above which includes the integrated shortcut function modules 108 and is thus able to process the SDD 146. In a second implementation, an application module 148 may not include the shortcut function module(s) 108. In this implementation, a separate shortcut handler module 150 may be configured to process the SDD 146. For example the shortcut handler module 150 may comprise an operating system plug-in, service, daemon, and so forth configured to process the SDD 146. The shortcut handler module 150 may comprise the shortcut function modules 108 and additional modules. In one implementation, the shortcut handler module 150 may be configured to pass the hash data 114, the application data 112, or both to the application module 148 associated with the SDD 146.

For ease of illustration, and not by way of limitation, the application module 106 may be considered operationally equivalent to the application module 148 and the shortcut handler module 150. Unless otherwise indicated herein, the combination of the application module 148 and the shortcut handler module 150 may be used interchangeably in place of the application module 106 having the integrated shortcut function module 108.

Furthermore, the shortcut function modules 108 as executing on different computing devices 102 may include different functionality or feature sets. For example, the shortcut function module 108 of the application module 106(1) may include the ability to generate SRD 110 but may omit the ability to receive or process SDD 146. Conversely, the application module 106(2) may include the ability to receive and process the SDD 146 but may omit the ability to generate the SRD 110.

In either the first or second implementations described above, the recipient 122 processes the SDD 146. The processing may include determination as to whether the application module 106 is installed on the recipient 122. For example, the application identifier in the hash data 114 may be inspected and compared to determine if the application module 106 which is associated with the shortcut is available for execution on the recipient 122. If the application module 106 is unavailable, a request for installation of the application module 106 may be made to the application distribution server 140. For example, in one implementation the link data 118 as included in the SDD 146 may be used to initiate installation of the application module 106 which is associated with the hash data 114. Use of the link data 118 allows for a low friction application experience in which the application module 106 may be readily installed and then used.

The processing also includes sending the shortcut request 132 as described above. For example, the shortcut function modules 108 may be used to generate the shortcut request 132 which includes the hash data 114 as received in the SDD 146.

As described elsewhere in this disclosure, the shortcut request 132 is processed by the shortcut server 126. Responsive to hash data 114 in the shortcut request 132, the shortcut processor module 128 retrieves from the shortcut data 130 the application data 112 associated with the hash data 114. At least a portion of the application data 112 may then be provided to the recipient 122.

The application module 106 (or the shortcut handler module 150) of the recipient 122 may accept the application data 112 and may configure the application module 106 (or the application module 148) using the application data 112. For example, the application module 106 of the recipient 122 may be configured with the application data 112 to re-create the state of the application module 106 of the sender 120 at the time the SRD 110 was generated. Thus, the application experience of the sender 120 is recreated for the recipient 122.

In some implementations fees may be calculated and assessed based on the operation of the system 100. For example, fees may be assessed for one or more of the processing of the SRD 110 by the shortcut server 126, delivery of the SDD 146, distribution of the application module 106 responsive to the link data 118, and so forth. Fees may include a transfer of remuneration from one party to another. The remuneration may include currency, points, virtual currency, or other value keeping units.

For ease of illustration, not necessarily as a limitation, the servers described in this disclosure are discussed in terms of a single device. However, it is understood that the servers may be implemented as a plurality of different hardware devices, virtual servers executing on one or more hardware devices, and so forth. The servers may be physically located in one or more geographic locations. For example, the shortcut server 126 may comprise a plurality of devices at multiple data centers located in different cities.

The system 100 may serve to enhance the distribution of the application module 106 to computing devices 102 which do not previously have the application module 106 installed thereon. For example, as use of the application module 106 takes place and users began sending shortcuts to other users, the link data 118 is used to easily install the application module 106 on the recipient 122 devices. Sending users thus have the convenience of being able to easily share the application experience, while the recipient users are easily able to acquire the application module 106 and partake in the application experience sent to them.

In addition to enhanced distribution, the ability to share the application experience by way of the shortcuts may also increase utilization of the application module 106 as well as increasing revenues associated with the application module 106. For example, users may be more inclined to make a purchase of a product or service which is associated with the shortcut from a friend, compared to finding the product or service from scratch on their own.

Additionally, the ability to share the application experience may improve user satisfaction with the application module 106 by providing enhanced support options. The enhanced support options may use the application experience sharing provided by the shortcuts to provide information to software support personnel at a help desk responsible for mobile application performance monitoring. For example, the SDD 146 may include the log data 116 as described in this disclosure. The SDD 110 or the SDD 146 may be provided to the software support personnel in the event of an unexpected or undesired occurrence while using the application module 106 on the sender 120 device. By using the system 100, users are able to quickly and easily provide meaningful information to the software support personnel which may be used to address the unexpected or undesired occurrence. Thus, instead of a long chat or telephone call with the software support personnel, the user may simply send a shortcut. This process may improve the user's overall experience with the application. This improved experience may be reflected in ratings or reviews made by the users of the application module 106, and so forth.

Figure 2:
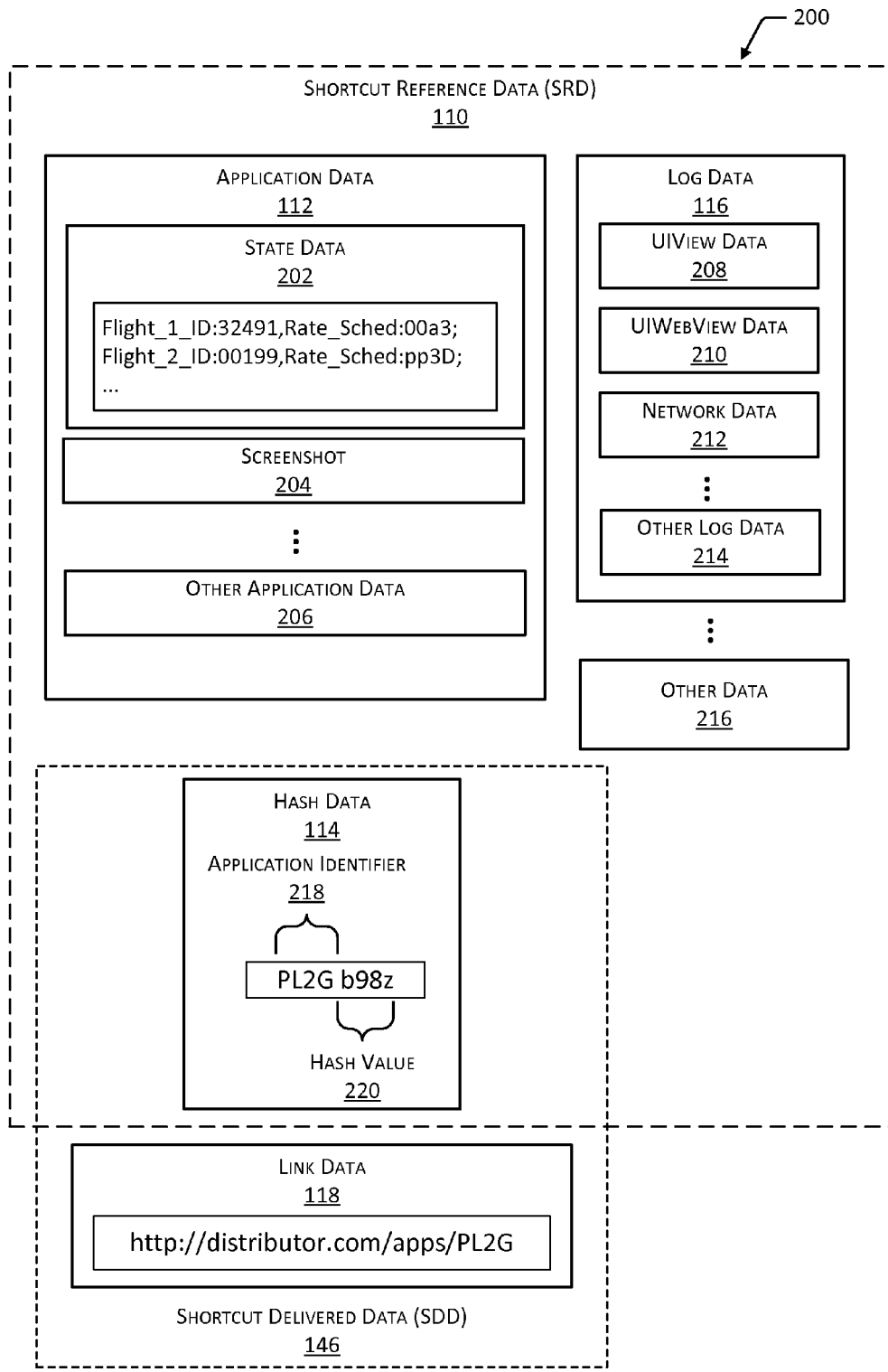
FIG. 2 depicts a block diagram of the SRD and the SDD used by the application experience sharing system.

FIG. 2 depicts a block diagram 200 of one implementation of the SRD 110 and the SDD 146 used by the application experience sharing system 100. As described above, the SRD 110 may comprise application data 112, hash data 114, and may also include log data 116. The application data 112 may include one or more of state data 202, a screenshot(s) 204, or other application data 206. The state data 202 may comprise one or more of: device identifier, user identifier, geographic location data, date and time, query terms, datastore referents, user interface settings, communication state information, application module serial number, application module version, operating system version, network address, media access control address, and so forth. The state data 202 is information associated with the application module 106 contemporaneous to a point in time at which the SRD 110 is generated. In some implementations the state data 202 may be the application module 106 state prior to the point in time at which the SRD 110 is generated. For example, the state data 202 may be periodically acquired, and the state data 202 from a few seconds before generation of the SRD 110 may be used in the shortcut. The state data 202 may be retrieved from the application module 106, the operating system under which the application module 106 is executing, other application modules 106, or a combination thereof. In some implementations the state data 202 may be expressed, stored, or transmitted as a string object, string class, and so forth. For example, the string object may comprise a contiguous sequence of code units.

The screenshot 204 may comprise one or more images acquired during presentation of a user interface by the sender 120. The screenshot 204 may comprise an image, set of images, or video which record images as generated for presentation by a display device. The screenshot 204 may be acquired by reading data from a memory location used by a graphics subsystem.

The other application data 206 may include browser cookies, state information acquired from external devices such as sensors, a user identifier, and so forth.

The software developer of the application module 106 may populate the application data 112 with information of their choosing. This information may be at whatever level of granularity the software developer chooses to provide in the application experience. For example, a first software developer of the application module 106(1) may choose to store as application data 112 background colors of the user interface 104. In comparison, a second software developer of the application module 106(2) may choose to store several kilobytes of information including information indicative of queries provided to an external server, processor register data, query results received, and so forth. In some implementations, the shortcut function module 108 may be configured to accept information expressed as a string, and generate the SRD 110 from the string.

The hash data 114 may comprise an application identifier 218 and a hash value 220. The application identifier 218 comprises information indicative of a particular application module 106 which generated the SRD 110. The application identifier 218 may be configured to use particular characters such as letters and numbers, have a maximum length, and so forth. For example, as shown in this illustration the application identifier 218 may comprise the four characters "PL2G" which are associated with the application module 106 titled "Playzes2Go". The application identifier 218 may incorporate one or more mnemonic devices to aid the user in remembering the application identifier 218. In some implementations, other well-known values may use the application identifier 218, such as a stock ticker identifier.

The hash value 220 is generated by using at least a portion of the application data 112 as input to a hashing function. For example, a portion of the state data 202 may be used as input to the hashing function. The hashing function may be configured to produce a hash value subject to one or more constraints. These constraints may include, but are not limited to one or more of: a minimum length, maximum length, inclusion of particular characters, exclusion of particular characters, particular arrangements of characters, and so forth. For example, the hashing function may be configured to produce a hash value 220 which only includes letters and has a minimum length of four characters.

The hashing function may process the inputs at an individual bit level, character level, by interpreting a string is an array of integers, and so forth. The hashing function may include cyclic redundancy checks, checksum functions, cryptographic hash functions, or a combination thereof. For example, the hashing function may implement a cyclic redundancy check (CRC), Pearson hash, Fowler-Noll-Vo hash, Java hashCode( ) hash, Jenkins hash, MD6 hash, SHA-512 hash, and so forth.

The hash data 114 is configured to provide a unique reference to the application data 112. The level of uniqueness used in operation system 100 may be such that a particular combination of application identifier 218 and hash value 220 is unique. For example the hash data 114 "PL2Gb98z" may be unique compared to "BOBOb98z". In some implementations the hash data 114 may be expired, allowing for reuse of previously issued hash values 220.

The hash data 114 is illustrated in this disclosure as a string in which the application identifier 218 is followed by the hash value 220. However, in other implementations the application identifier 218 may be positioned after the hash value 220 in the hash data 114 straight. In another implementation, the application identifier 218 may be distributed before and after the hash value 220, or the application identifier 218 and hash value 220 may be otherwise interspersed with one another. For example, the hash data 114 may alternate positions used by the application identifier 218 and the hash value 220, such that the hash data 114 in this example would be expressed as "PbL928 Gz".

As described elsewhere, in some implementations the SRD 110 may include log data 116. The log data 116 may include information which is acquired by an operating system of the sender 120, the application module 106 generating the SRD 110, another application module 106 executing on the sender 120, and so forth. The log data 116 may comprise information indicative of the operation of the sender 120, the interaction of the sender 120 with other devices, interactions between the modules executing on the sender 120, and so forth.

The log data 116 may include one or more of: UIView data 208, UIWebView data 210, network data 212, or other log data 214. The UIView data 208 comprises information about a UIView class in use by the application module 106. For example, such as may be used to define an area on a display for presentation of content. The UIWebView data 210 comprises information about a UIWebView classes in use by the application module 106. For example, such as may be used to embed web content within the application module 106. The network data 212 may include information associated with a network communication stack executing on the sender 120. For example, the network data 212 may include capture of at least a portion of network traffic to and from the sender 120. The other log data 214 may include crash dumps, console output, heap size utilization, hardware utilization statistics, and so forth.

The log data 116 may be continuously or periodically acquired prior to generation of the SRD 110. The periodic acquisition may be triggered by a timer, or occurrence of one or more events. For example, the events may include application startup, application termination, initiation of a communication session with an external device, and so forth. The log data 116 may be discarded in a last-in-last-out fashion, allowing for ongoing capture of information leading up to the point in time at which the generation of the SRD 110 was initiated.

The SRD 110 may include other data 216. For example, the other data 216 may include information such as preferred encryption settings for communication, screen brightness, touch sensor sensitivity, volume level, and so forth.

As described elsewhere, the SRD 110 is provided to the shortcut server 126. The SDD 146 is provided to the recipient(s) 122. As illustrated in this figure, the SDD 146 may comprise the hash data 114 and the link data 118.

Alternatively, the SDD 146 may comprise the hash value 220 and may include one or more of: the application identifier 218 or the link data 118.

In one implementation the application identifier 218 may be omitted. Instead, the link data 118 may be used in place of the application identifier 218 as well as to initiate installation, should installation be called for.

In another implementation, the SDD 146 may comprise the hash data 114. The recipient 122 may determine based at least in part on the application identifier 218 that the application module 106 is not installed on the recipient 122. In this implementation, the shortcut request 132 may include a request for the link data 118. The link data 118 may then be included in a response by the shortcut server 126. Once received by the recipient 122, the link data 118 may be used to initiate installation of the application module 106 from the application distribution server 140.

The link data 118 may be configured to provide traceability of origin, such that a determination may be made of the number of distributions resulting from the SDD 146. For example, link data 118 may refer to a particular URI which differs from a URI associated with browsing an application store to acquire the application module 106.

The link data 118 may be configured for operation with particular operating systems. For example, the link data 118 may comprise an Apple launch URL compatible with iOS®.

Figure 3:
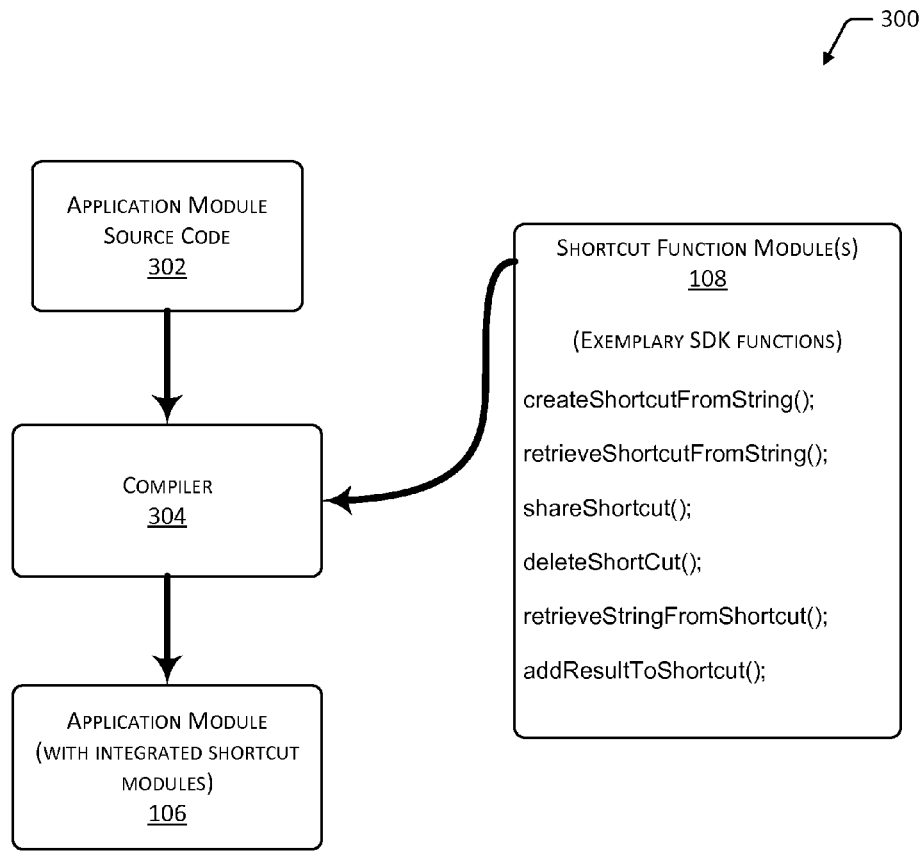
FIG. 3 illustrates a flow diagram of integration of shortcut functions at compile time with an application module.

FIG. 3 illustrates a flow diagram 300 of integration of shortcut functions at compile time with an application module. Some operating systems which may be used by the computing devices 102 may be configured to enforce various security policies, such as sandboxing. Sandboxing involves maintaining segregation between different application modules 106 executing on the same computing device 102. Because of the segregation, transfer of data between different application modules 106 executing in different sandboxes may be difficult or impossible.

The shortcut function modules 108 may be provided as a software development kit or set of libraries which may be incorporated into the application module 106 during compile of the application module 106 by a compiler application. As illustrated in FIG. 3, application module source code 302 is provided to a compiler 304. The shortcut function modules 108 are also provided to the compiler 304. For example, the shortcut function modules 108 may be provided as a software development kit (SDK) for use by the software developers.

During compilation, the shortcut function modules 108 may be incorporated within the executable application module 106 or may be referenced using static links to the shortcut function modules 108 or libraries storing these modules. As a result, the operations provided by the shortcut function modules 108 are integrated with the application module 106 as provided by the developer, and the functionality associated with sharing the application experience is available in the operating system which uses sandboxes or other security measures.

The shortcut function modules 108 provide functions which may be called by the application module 106. By way of illustration, not necessarily as a limitation, the functions may include:

createShortcutFromString( );
    addResultToShortcut( );
    shareShortcut( );
    retrieveShortcutFromString( );
    retrieveStringFromShortcut( );
    deleteShortCut( );

The createShortcutFromString( ) function is configured to access at least a portion of the application data 112 and generate at least a portion of the hash data 114. For example, the function may determine the application identifier 218, generate the hash value 220, and concatenate the two to form the hash data 114.

The addResultToShortcut( ) function is configured to allow the inclusion of additional information to, or update, an existing SRD 110. In one implementation, this function may be used to produce a hash value 220 which is based on query results which have been received from an external server responsive to query conditions expressed in the state data 202. In another implementation, the hash data 114 may remain unchanged while the application data 112 is modified or appended to.

The shareShortcut( ) function is configured to provide the SRD 110 to the shortcut server 126, the SDD 146 to the recipient 122, or both. For example, the function may be configured to establish a communication channel with the shortcut server 126.

The retrieveShortcutFromString( ) function is configured to convert the application data 112 to the hash data 114. The application data 112 may be expressed as a string in some implementations.

The retrieveStringFromShortcut( ) function is configured to convert the hash data 114 to the application data 112. The application data 112 may be expressed as a string in some implementations.

The deleteShortCut( ) function is configured to allow the application module 106 to delete an existing shortcut. In one implementation, this function may remove the corresponding entry in the shortcut data 130 stored on the shortcut server 126. In another implementation, this function may be used to refresh or update data associated with the SRD 110.

One of the functions which may be provided by the shortcut function modules 108 is de-duplication. De-duplication prevents the generation of SRD 110 which is duplicative or has been previously generated. For example, the hash data 114 may be compared with previously generated hash data 114 to look for identical values. Upon determining that an identical value exists, the more recent information associated with a pending SRD 110 may be discarded in the generation of the pending SRD 110 may be discontinued.

The shortcut function modules 108 may also be configured to provide data compression, encryption, and so forth. For example, the application data 112 may be compressed and de-compressed using a GZIP algorithm.

In another implementation where the operating system permits exchange of data between application modules, the shortcut handler module 150 may operate to process the SDD 146 and provide associated functionality. The shortcut handler module 150 may be implemented as an operating system plug-in, service, daemon, and so forth. In this implementation, the shortcut handler module 150 may exchange information with the application module 148 using one or more features of the operating system, such as an inter-process communication (IPC).

Figure 4:
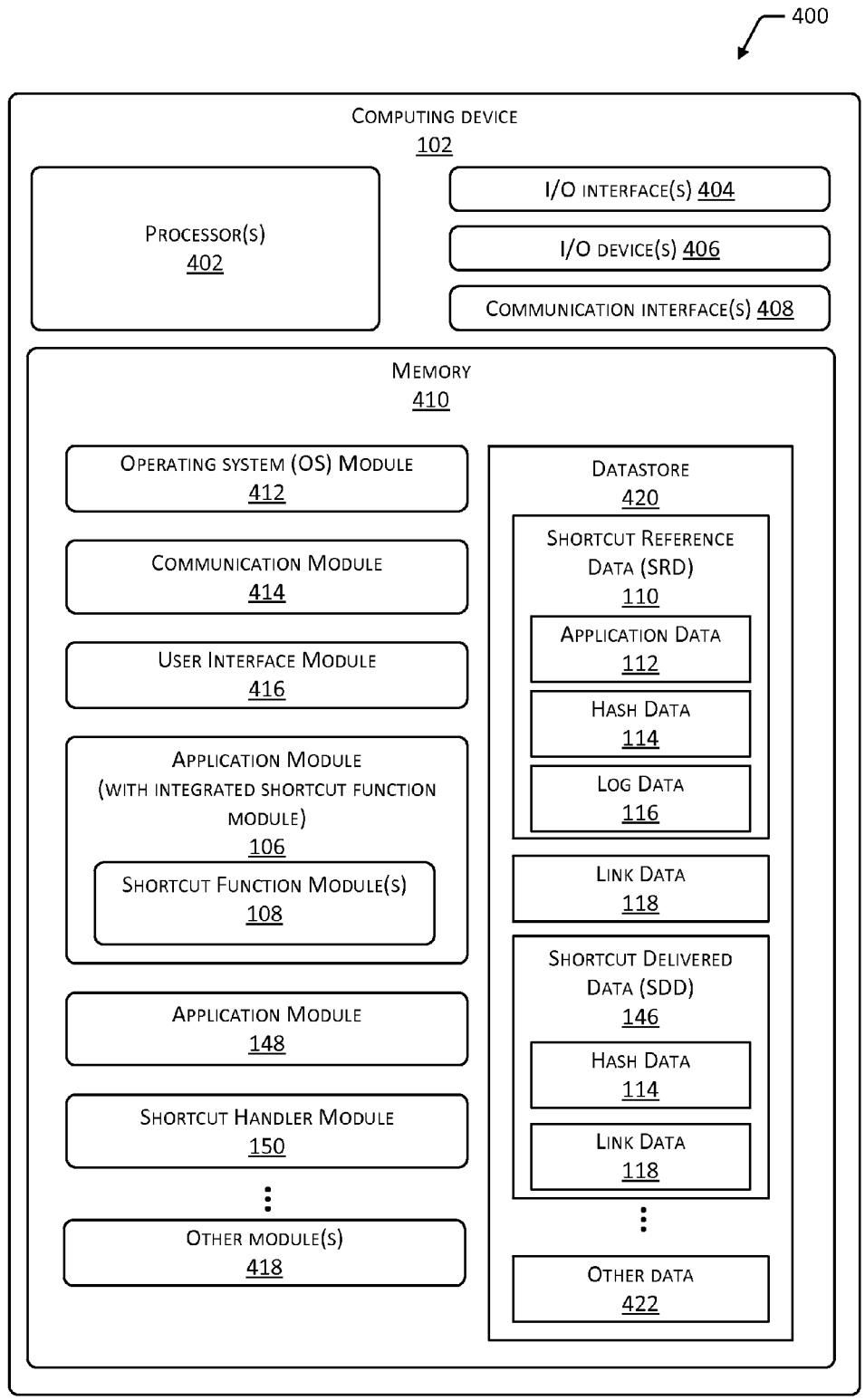
FIG. 4 depicts a block diagram of a computing device configured to operate as a sender of SRD, receiver of SDD, or both, to provide application experience sharing.

FIG. 4 depicts a block diagram 400 of the computing device 102. As described elsewhere in this disclosure, the computing device 102 may be configured to operate as a sender 120, recipient 122, or both. The computing device 102 may include one or more hardware processors (processors) 402 configured to execute one or more stored instructions. The processors 402 may comprise one or more cores.

The computing device 102 may include one or more input/output ("I/O") interface(s) 404 to allow the computing device 102 to communicate with other devices. For example, the I/O interface(s) 404 may be configured to provide a universal serial bus (USB) connection.

The computing device 102 may include one or more input/output ("I/O") interface(s) 404 to allow the processor 402 or other portions of the computing device 102 to communicate with other devices. The I/O interfaces 404 may comprise inter-integrated circuit (I2C), serial peripheral interface bus (SPI), Universal Serial Bus (USB) as promulgated by the USB Implementers Forum, RS-232, one or more media interfaces such as High Definition Multimedia Interface (HDMI) as promulgated by HDMI Licensing LLC, and so forth.

The I/O interface(s) 404 may couple to one or more I/O devices 406. The I/O devices 406 may include input devices such as one or more of a camera, a microphone, a touch sensor, a button, fingerprint reader, motion sensor, magnetometer, and so forth. The I/O devices 406 may also include output devices such as one or more of a display, audio speakers, haptic output devices, and so forth. In some embodiments, the I/O devices 406 may be physically incorporated with the computing device 102 or may be externally placed.

The computing device 102 may also include one or more communication interfaces 408. The communication interfaces 408 are configured to provide communications between the computing device 102 and other devices, such as other computing devices 102, routers, access points, servers, and so forth. The communication interfaces 408 may be configured to couple wired or wirelessly to one or more networks 124, such as PANs, LANs, WANs, personal area networks, and so forth. For example, the communication interfaces 408 may be configurable to connect to Ethernet, Wi-Fi™, Bluetooth®, 3G, 4G, LTE, and so forth.

The computing device 102 may also include one or more busses or other internal communications hardware or software that allow for the transfer of data between the various modules and components of the computing device 102.

The computing device 102 includes one or more memories 410. The memory 410 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 410 provides storage of computer readable instructions, data structures, program modules, and other data for the operation of the computing device 102.

The memory 410 may include at least one operating system ("OS") module 412. The OS module 412 is configured to manage hardware resource devices such as the I/O interfaces 404, the I/O devices 406, the communication interfaces 408, and provide various services to applications or modules executing on the processors 402. The OS module 412 may implement one or more of iOS® from Apple Corp. of Cupertino, Calif.; Windows Mobile® from Microsoft Corp. of Redmond, Wash.; Android® from Google, Inc. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif. In cases where the OS module 412 implements a version of iOS®, any version of iOS® may be supported including iOS® 1.x, 2.x, 3.x, 4.x, 5.x, 6.x, 7.x, or higher versions, including any version of iOS® for the iPhone®, iPad®, iPod Touch®, or any other compatible, derivative, or related device. In cases where the OS module 412 implements a version of Android®, any version of Android® may be supported including but not limited to versions 2.3.x "Gingerbread," 4.0.x "Ice Cream Sandwich," 4.1.x "Jelly Bean," and so forth. In some implementations the OS module 412 may be configured to sandbox applications.

Also stored in the memory 410 may be one or more of the following modules. These modules may be executed as foreground applications, background tasks, services, daemons, and so forth.

A communication module 414 may be configured to provide communication with devices external to the computing device 102 using the communication interfaces 408. The communication module 414 may be configured to support hypertext transport protocol (HTTP), file transfer protocol (FTP), WebSockets (WS), secured socket layer (SSL), transport layer security (TLS), and so forth. The communications may be authenticated, encrypted, and so forth.

User interface module 416 is configured to provide the user interface 104. The user interface module 416 may be configured to provide output using one or more of the I/O devices 406 such as the display, speakers, or haptic output device. The user interface module 416 may also be configured to accept input using or more of the I/O devices 406 such as the touch sensor.

The memory 410 may store one or more of: the application module 106 with the integrated shortcut function module 108, the shortcut function module(s) 108, the application module 148, or the shortcut handler module 150.

The application module 106 may be configured to provide one or more functions including but not limited to data retrieval, data storage, data processing, and so forth. The application module 106 may incorporate the shortcut function modules 108. As described with regard to FIG. 3, the shortcut function modules 108 may be integrated with the application module 106 at compile time.

The shortcut function modules 108 provide functions associated with generating, processing, and using the shortcuts. In some implementations the shortcut function modules 108 may be implemented as one or more libraries which may be statically linked to the application module 106 at compile time.

In some implementations, the application module 148 may omit the integration of the shortcut functional modules 108. In this implementation, a shortcut handler module 150 may be used to process the shortcuts.

Other modules 418 may also be stored in the memory 410, such as speech recognition modules, cryptographic modules, and so forth.

The memory 410 also includes a datastore 420 to store information for operations of the computing device 102. The datastore 420 may comprise a database, array, structured list, tree, scripts, executable code, or other data structure to store information. The datastore 420 may store one or more of: the SRD 110, the link data 118, or the SDD 146. Other data 422 may also be stored, such as user preferences, configuration settings, SRD processing rules, SDD processing rules, and so forth. For example, the SRD processing rules may set forth conditions under which the SRD 110 may be generated. Continuing the example the application module 106 may implement rules prohibiting generation of the SRD 110 within certain portions of the application module 106 user interface 104. In another example, the SDD processing rules may set forth conditions which determine how the SDD 146 is processed. Continuing this example, the SDD 146 from particular senders may be automatically processed, while SDD 146 from others may prompt for user confirmation before utilizing.

Figure 5:
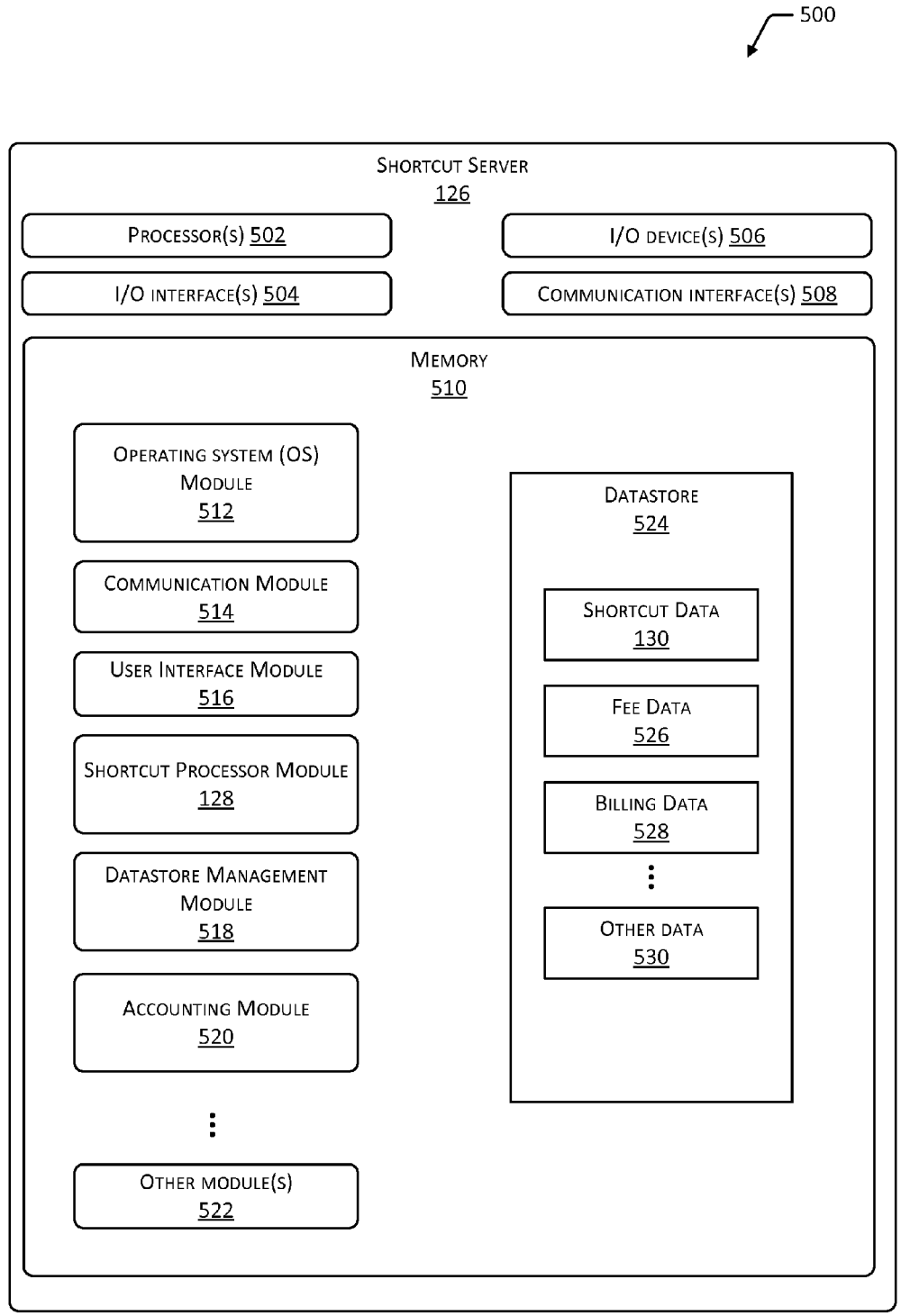
FIG. 5 depicts a block diagram of a shortcut server configured to receive SRD and respond to requests for application state data based on hash data.

FIG. 5 depicts a block diagram 500 of the shortcut server 126. The shortcut server 126 may be configured to process SRD 110 and respond to shortcut requests 132, as well as other functions. The shortcut server 126 may include one or more hardware processors (processors) 502 configured to execute one or more stored instructions. The processors 502 may comprise one or more cores. The shortcut server 126 may include one or more I/O interface(s) 504 to allow the processor 502 or other portions of the shortcut server 126 to communicate with other devices. The I/O interfaces 504 may comprise I2C, SPI, USB, RS-232, and so forth.

The I/O interface(s) 504 may couple to one or more I/O devices 506. The I/O devices 506 may include input devices such as one or more of a keyboard, mouse, scanner, and so forth. The I/O devices 506 may also include output devices such as one or more of a display, audio speakers, and so forth. In some embodiments, the I/O devices 506 may be physically incorporated with the shortcut server 126 or may be externally placed.

The shortcut server 126 may also include one or more communication interfaces 508. The communication interfaces 508 are configured to provide communications between the shortcut server 126 and other devices, such as the computing devices 102, routers, access points, and so forth. The communication interfaces 508 may be configured to communicate with the network 124, including personal area networks (PANs), local area networks (LANs), wide-area networks (WANs), and so forth.

The shortcut server 126 may also include one or more busses or other internal communications hardware or software that allow for the transfer of data between the various modules and components of the shortcut server 126.

As shown in FIG. 5, the shortcut server 126 includes one or more memories 510. The memory 510 comprises one or more CRSM as described above. The memory 510 provides storage of computer readable instructions, data structures, program modules and other data for the operation of the shortcut server 126.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variation of the Linux operating system as promulgated by Linus Torvalds, the FreeBSD operating system, the Windows® Server operating system from Microsoft Corporation of Redmond, Wash., and so forth.

Also stored in the memory 510 may be one or more of the following modules. These modules may be executed as foreground applications, background tasks, daemons, services, and so forth.

A communication module 514 may be configured to provide communication with devices external to the shortcut server 126 using the communication interfaces 508. The communication module 514 may be configured to support HTTP, FTP, WS, SSL, TLS, and so forth. The communications may be authenticated, encrypted, and so forth. For example, the communication module 514 may be configured to exchange information with the computing device 102, the communication server 134, the application distribution server 140, and so forth.

A user interface module 516 is configured to provide one or more interfaces with which the shortcut server 126 may interact with other devices. In one implementation of the user interface module 516 may implement an HTTP server, such as the Apache Web server. In another implementation the user interface module 516 may provide one or more application programming interfaces (API) which may be accessed by the other devices, such as the computing devices 102.

The shortcut processor module 128 may also be stored in the memory 510. The shortcut processor module 128 is configured to receive SRD 110 as provided by the sender 120. Once received, the SRD 110 or a portion thereof is stored within the shortcut data 130.

The shortcut processor module 128 may provide additional processing on the SRD 110 or the contents thereof in some situations. For example, implementations where the SRD 110 omits the hash data 114, the shortcut processor module 128 may generate the hash data 114 from the application data 112.

The shortcut processor module 128 may also be configured to generate the hash data 114 and compare this locally generated information with the hash data 114 as received in the SRD 110. This comparison may be used to determine if the SRD 10 has been corrupted or modified while in transit. For example, a difference in the hash data 114 included in the SRD 110 and hash data 114 generated by the shortcut processor module 128 based on the application data 112 may indicate the SRD 110 has been tampered with.

The shortcut processor module 128 is also configured to respond to shortcut requests 132. The shortcut request 132 may be received from the recipient 122. The shortcut request 132 may include the hash data 114. Based at least in part on the hash data 114, the shortcut processor module 128 may be configured to retrieve corresponding application data 112 from the shortcut data 130.

A datastore management module 518 may be configured to respond to requests made by the shortcut processor module 128 or other modules to store or retrieve information. For example, the database management module 518 may comprise a database management system such as MySQL, PostgreSQL, SQLite, Microsoft SQL Server, Oracle, SAP, IBM DB2, and so forth.

An accounting module 520 may be configured to calculate fees associated with the use of the shortcut server 126. For example the accounting module 520 may be configured to retrieve information indicative of the number of application modules 106 which have been distributed by the application distribution server 140 responsive to link data 118. Continuing the example, based on this information the accounting module 520 may assess a fee.

Other modules 522 may also be present in the memory 510. For example, a payment processing module may be configured to initiate transfers of the fees assessed by the accounting module 520.

The memory 510 may also include a datastore 524 to store information. The datastore 524 may comprise a database, array, structured list, tree, scripts, executable code, or other data structure to store information. In some implementations, the datastore 524 or a portion of the datastore 524 may be distributed across one or more other devices including other servers, network attached storage devices, and so forth.

The datastore 524 may store the shortcut data 130, fee data 526, billing data 528, other data 530, and so forth. The fee data 526 may include rate schedules, compensation matrices, and so forth which are indicative of fees to be assessed for services provided by the shortcut server 126. The accounting module 520 may access the fee data 526 and use this information to determine the fees. The billing data 528 may comprise information indicating what dollar values are to be billed or assessed to particular entities. For example the billing data 528 may indicate that the software developer is assessed a $25 fee for 50 distributions of the application module 106 by the application distribution server 140 which were initiated by the link data 118. The other data 530 may include user preferences, configuration files, and so forth.

FIG. 6 depicts a block diagram 600 of the shortcut data 130 as stored by the shortcut server 126. The shortcut data 130 may include information received in the SRD 110, associated with the receiving of the information, and so forth. As illustrated here, a sender identifier 602 may be stored. The sender identifier 602 may provide information indicative of a particular computing device 102, a particular user account logged into or otherwise associated with the computing device 102, or a combination of both, which provided the SRD 110. For example, the sender identifier 602 may comprise a media access control (MAC) address associated with one or more of the communication interfaces 408, a universally unique identifier (UUID) assigned to the computing device 102, and so forth.

The shortcut data 130 may also include hash data 114, application data 112, link data 118, and the log data 116. Additional information may also be stored as the shortcut data 130. For example, the shortcut data 130 may include distribution permissions associated with the SRD 110. A particular sender identifier 602 may have specific permission to provide shortcuts to specific user accounts, computing devices 102, or various groups or combinations thereof. Continuing the example, the sender identifier 602 associated with a child may be configured such that the shortcut request 132 will only be responded to when received from recipient devices 122 designated as having permission to open the shortcut. In some implementations, these permissions may be based on contractual or legal considerations. For example, in some situations application experience sharing with others in a country may be permitted, while sharing with those outside of the country may not be.

In some implementations, the hash data 114 may serve as a primary key or unique identifier within the shortcut data 130 to identify a particular shortcut or application experience. In another implementation, a combination of the hash data 114 and the sender identifier 602 may be used as the primary key.

In some implementations one or more of the SRD 110, the SDD 146, and so forth may be encrypted. The shortcut data 130 may be used to store cryptographic keys associated with a particular shortcut.

The shortcut data 130 is depicted as a table by way of illustration, and not necessarily as a limitation. The shortcut data 130 may be stored in non-tabular data structures, such as arrays, lists, object databases, and so forth. Similarly, other tables depicted in this disclosure are illustrative and the data described therein may be stored using other data structures.

Figure 7:
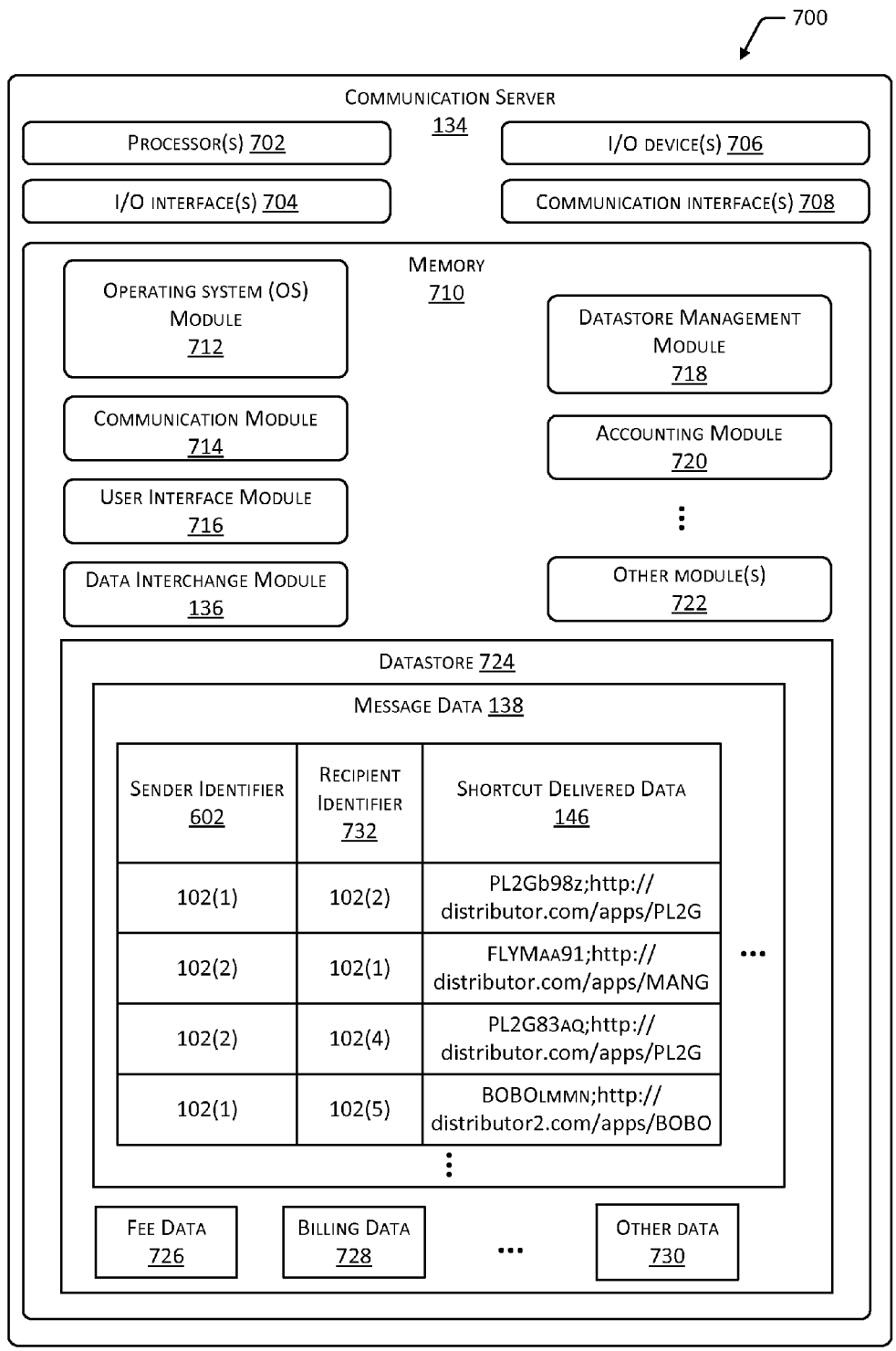
FIG. 7 depicts a block diagram of a communication server configured to provide SDD to one or more recipient computing devices.

FIG. 7 depicts a block diagram 700 of the communication server 134. The communication server 134 may be configured to support communications between the computing devices 102, such as the sender 120 and one or more recipients 122. The communication server 134 may include one or more hardware processors 702 (processors) configured to execute one or more stored instructions. The processors 702 may comprise one or more cores. The communication server 134 may include one or more I/O interface(s) 704 to allow the processor 702 or other portions of the communication server 134 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, mouse, scanner, and so forth. The I/O devices 706 may also include output devices such as one or more of a display, audio speakers, and so forth. In some embodiments, the I/O devices 706 may be physically incorporated with the computing device 102 or may be externally placed.

The communication server 134 may also include one or more communication interfaces 708. The communication interfaces 708 are configured to provide communications between the communication server 134 and other devices, such as the computing devices 102, routers, access points, and so forth. The communication interfaces 708 may be configured to communicate with the network 124, including PANs, LANs, WANs, and so forth.

The communication server 134 may also include one or more busses or other internal communications hardware or software that allow for the transfer of data between the various modules and components of the communication server 134.

As shown in FIG. 7, the communication server 134 includes one or more memories 710. The memory 710 comprises one or more CRSM as described above. The memory 710 provides storage of computer readable instructions, data structures, program modules, and other data for the operation of the communication server 134.

The memory 710 may include at least one OS module 712. The OS module 712 is configured to manage hardware resource devices such as the I/O interfaces 704, the I/O devices 706, the communication interfaces 708, and provide various services to applications or modules executing on the processors 702. The OS module 712 may implement a variation of the Linux operating system, the FreeBSD operating system, the Windows® Server operating system, and so forth.

Also stored in the memory 710 may be one or more of the following modules. These modules may be executed as foreground applications, background tasks, daemons, services, and so forth.

A communication module 714 may be configured to provide communication with devices external to the communication server 134 using the communication interfaces 708. The communication module 714 may be configured to support hypertext transport protocol (HTTP), file transfer protocol (FTP), WebSockets (WS), secured socket layer (SSL), transport layer security (TLS), and so forth. The communications may be authenticated, encrypted, and so forth. For example, the communication module 714 may be configured to exchange information with the computing device 102, the application distribution server 140, and so forth.

A user interface module 716 is configured to provide one or more interfaces with which the communication server 134 may interact with the other devices. In one implementation of the user interface module 716 may implement an HTTP server, such as the Apache Web server. In another implementation the user interface module 716 may provide one or more APIs which may be accessed by other devices, such as the computing devices 102.

The data interchange module 136 may also be stored in the memory 710. The data interchange module 136 is configured to receive transfer messages with the computing devices 102. The data interchange module 136 may receive a message from the sender 120 and provide the message to the recipient 122. As described in this disclosure, the message may include the SDD 146. For example, the data interchange module 136 may comprise an email service, configured to route email messages. In another example, the data interchange module 136 may comprise a social networking website at which users may post information. The data interchange module 136 may be configured to maintain and access the message data 138.

A datastore management module 718 may be configured to respond to requests made by the data interchange module 136 or other modules to store or retrieve information. For example, the database management module 718 may comprise a database management system such as MySQL, PostgreSQL, SQLite, Microsoft SQL Server, Oracle, SAP, IBM DB2, and so forth.

An accounting module 720 may be configured to calculate fees associated with the use of the communication server 134. For example the accounting module 720 may be configured to access the message data 138 indicative of the number of messages including SDD 146 which have been distributed by to recipients 122. Continuing the example, based on this information the accounting module 720 may assess a fee.

Other modules 722 may also be present in the memory 710. For example, a payment processing module may be configured to initiate transfers of the fees assessed by the accounting module 720.

The memory 710 may also include a datastore 724 to store information. The datastore 724 may comprise a database, array, structured list, tree, scripts, executable code, or other data structure to store information. In some implementations, the datastore 724 or a portion of the datastore 724 may be distributed across one or more other devices including other servers, network attached storage devices, and so forth.

The datastore 724 may store the message data 138, fee data 726, billing data 728, other data 730, and so forth. The message data 138 may comprise one or more of: the sender identifier 602, a recipient identifier 732, or the SDD 146. The recipient identifier 732 may provide information indicative of a particular computing device 102, a particular user account logged into or otherwise associated with the computing device 102, or a combination of both, which provided the SRD 110. For example, the recipient identifier 732 may comprise a media access control (MAC) address associated with one or more of the communication interfaces 708, a universally unique identifier (UUID) assigned to the computing device 102, and so forth.

The message data 138 may also include other information such as network routing information, network addresses, a geographic location associated with the sending computing device 102, the receiving computing device 102, and so forth.

The fee data 726 may include rate schedules, compensation matrices, and so forth which are indicative of fees to be assessed for services provided by the communication server 134. The accounting module 720 may access the fee data 726 and use this information to determine the fees. The billing data 728 may comprise information indicating what dollar values are to be billed or assessed to particular entities. For example the billing data 728 may indicate that the user account associated with the sender 120 is assessed a $0.05 fee for transmission of an SMS message. In some implementations, the fee data 726 may vary based on the type of message. For example, a message which includes the SDD 146 may be delivered at no charge or at a different cost then another message. In another example, fees assessed for delivery of the message which includes the SDD 146 may be shifted to another party. For example, the software developer of the application module 106 for the SDD 146 may choose to pay for the delivery of messages which include the SDD 146 to encourage use of the shortcuts in the application module 106.

The other data 730 may include user preferences, configuration files, network status, and so forth.

Figure 8:
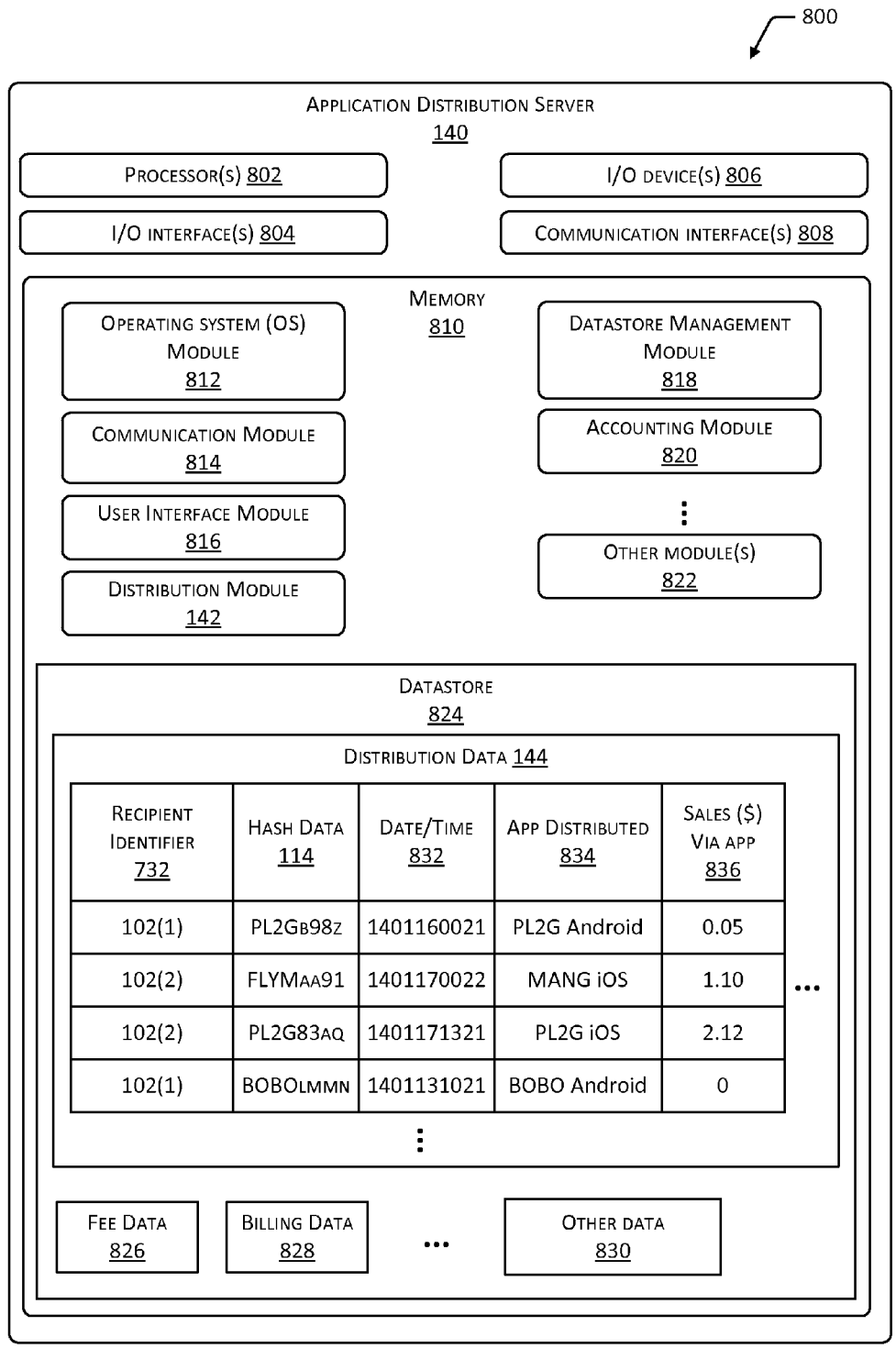
FIG. 8 depicts a block diagram of an application distribution server configured to deliver an application to a recipient computing device.

FIG. 8 depicts a block diagram 800 of the application distribution server 140. The application distribution server 140 may be configured to distribute the application module 106 or 148 to the computing devices 102. The application distribution server 140 may include one or more hardware processors 802 (processors) configured to execute one or more stored instructions. The processors 802 may comprise one or more cores. The application distribution server 140 may include one or more I/O interface(s) 804 to allow the processor 802 or other portions of the application distribution server 140 to communicate with other devices. The I/O interfaces 804 may comprise I2C, SPI, USB, RS-232, and so forth.

The I/O interface(s) 804 may couple to one or more I/O devices 806. The I/O devices 806 may include input devices such as one or more of a keyboard, mouse, scanner, and so forth. The I/O devices 806 may also include output devices such as one or more of a display, audio speakers, and so forth. In some embodiments, the I/O devices 806 may be physically incorporated with the computing device 102 or may be externally placed.

The application distribution server 140 may also include one or more communication interfaces 808. The communication interfaces 808 are configured to provide communications between the application distribution server 140 and other devices, such as the computing devices 102, routers, access points, and so forth. The communication interfaces 808 may be configured to communicate with the network 124, including PANs, LANs, WANs, and so forth.

The application distribution server 140 may also include one or more busses or other internal communications hardware or software that allow for the transfer of data between the various modules and components of the application distribution server 140.

As shown in FIG. 8, the application distribution server 140 includes one or more memories 810. The memory 810 comprises one or more CRSM as described above. The memory 810 provides storage of computer readable instructions, data structures, program modules and other data for the operation of the application distribution server 140.

The memory 810 may include at least one OS module 812. The OS module 812 is configured to manage hardware resource devices such as the I/O interfaces 804, the I/O devices 806, the communication interfaces 808, and provide various services to applications or modules executing on the processors 802. The OS module 812 may implement a variation of the Linux operating system, the FreeBSD operating system, the Windows® Server operating system, and so forth.

Also stored in the memory 810 may be one or more of the following modules. These modules may be executed as foreground applications, background tasks, daemons, services, and so forth.

A communication module 814 may be configured to provide communication with devices external to the application distribution server 140 using the communication interfaces 808. The communication module 814 may be configured to support HTTP, FTP, WS, SSL, TLS, and so forth. The communications may be authenticated, encrypted, and so forth. For example, the communication module 814 may be configured to exchange information with the computing device 102, the shortcut server 126, the communication server 134, and so forth.

A user interface module 816 is configured to provide one or more interfaces with which the application distribution server 140 may interact with the other devices. In one implementation of the user interface module 816 may implement an HTTP server, such as the Apache Web server. In another implementation the user interface module 816 may provide one or more APIs which may be accessed by other devices, such as the computing devices 102.

The distribution module 142 may also be stored in the memory 810. The distribution module 142 is configured to provide the application module 106 or the application module 148, the shortcut handler module 150, and so forth to the computing device 102. The distribution module 142 may be a portion of, or support operation of, an application store operated by a merchant. Users may access the application store by way of the computing devices 102. Once accessed, the users may initiate distribution of the desired application module.

Initiation of distribution of the application module may be facilitated by the link data 118. For example, the recipient 122 may process the SDD 146 to determine a URI which accesses the distribution module 142 with regard to a particular application module 106. The distribution module 142 may be configured to accept a request using the URI to begin a process which may result in the installation of the application module 106. Continuing the example, the distribution module 142 may provide using the user interface module 816 a set of terms of service which may be accepted by the user and in turn may lead to transmission of installation files associated with the application module 148.

A datastore management module 818 may be configured to respond to requests made by the distribution module 142 or other modules to store or retrieve information. For example, the database management module 818 may comprise a database management system such as MySQL, PostgreSQL, SQLite, Microsoft SQL Server, Oracle, SAP, IBM DB2, and so forth.

An accounting module 820 may be configured to calculate fees associated with the use of the application distribution server 140. For example the accounting module 820 may be configured to access the distribution data 144 indicative of a number of applications distributed to recipients 122. Continuing the example, based on this information the accounting module 820 may assess a fee for these distributions.

Other modules 822 may also be present in the memory 810. For example, a payment processing module may be configured to initiate transfers of the fees assessed by the accounting module 820.

The memory 810 may also include a datastore 824 to store information. The datastore 824 may comprise a database, array, structured list, tree, scripts, executable code, or other data structure to store information. In some implementations, the datastore 824 or a portion of the datastore 824 may be distributed across one or more other devices including other servers, network attached storage devices, and so forth.

The datastore 824 may store the distribution data 144, fee data 826, billing data 828, other data 830, and so forth. The distribution data 144 may comprise one or more of: the recipient identifier 732, the hash data 114, a date/time of distribution 832, information indicative of the application distributed 834, sales associated with or resulting from the distributed application module 836, and so forth. The information indicative of the application distributed 834 may comprise one or more of: an application serial number, application title, version number, build number, or other information. In some implementations the application distributed 834 may be broken down by operating system of the recipient 122, version of the application module 106 distributed, and so forth. The sales associated with or resulting from distributed application module 834 may comprise information indicative of sales made using the application module 106 as distributed, originating from an interaction on the recipient device 122 which is associated with the shortcut, and so forth. For example, the sender 120 may receive remuneration for sending a shortcut which results in a purchase.

The distribution data 144 may also include other information such as a geographic location associated with the recipient 122, count of the number of times the same application module 106 has been distributed to the same computing device 102, and so forth.

The fee data 826 may include rate schedules, compensation matrices, and so forth which are indicative of fees to be assessed for services provided by the application distribution server 140. The accounting module 820 may access the fee data 826 and use this information to determine the fees. The billing data 828 may comprise information indicating what dollar values are to be billed or assessed to particular entities. For example the billing data 828 may indicate that the account associated with the software developer is assessed a $1.00 fee for each distribution of the application module 106.

The other data 830 may include user preferences, configuration files, blacklisted computing devices 102, and so forth. For example, a particular computing device 102 which is continuously downloading the same application module 106 may be blacklisted and prevented from further distribution of the application module 106.

Illustrative Processes

Figure 9:
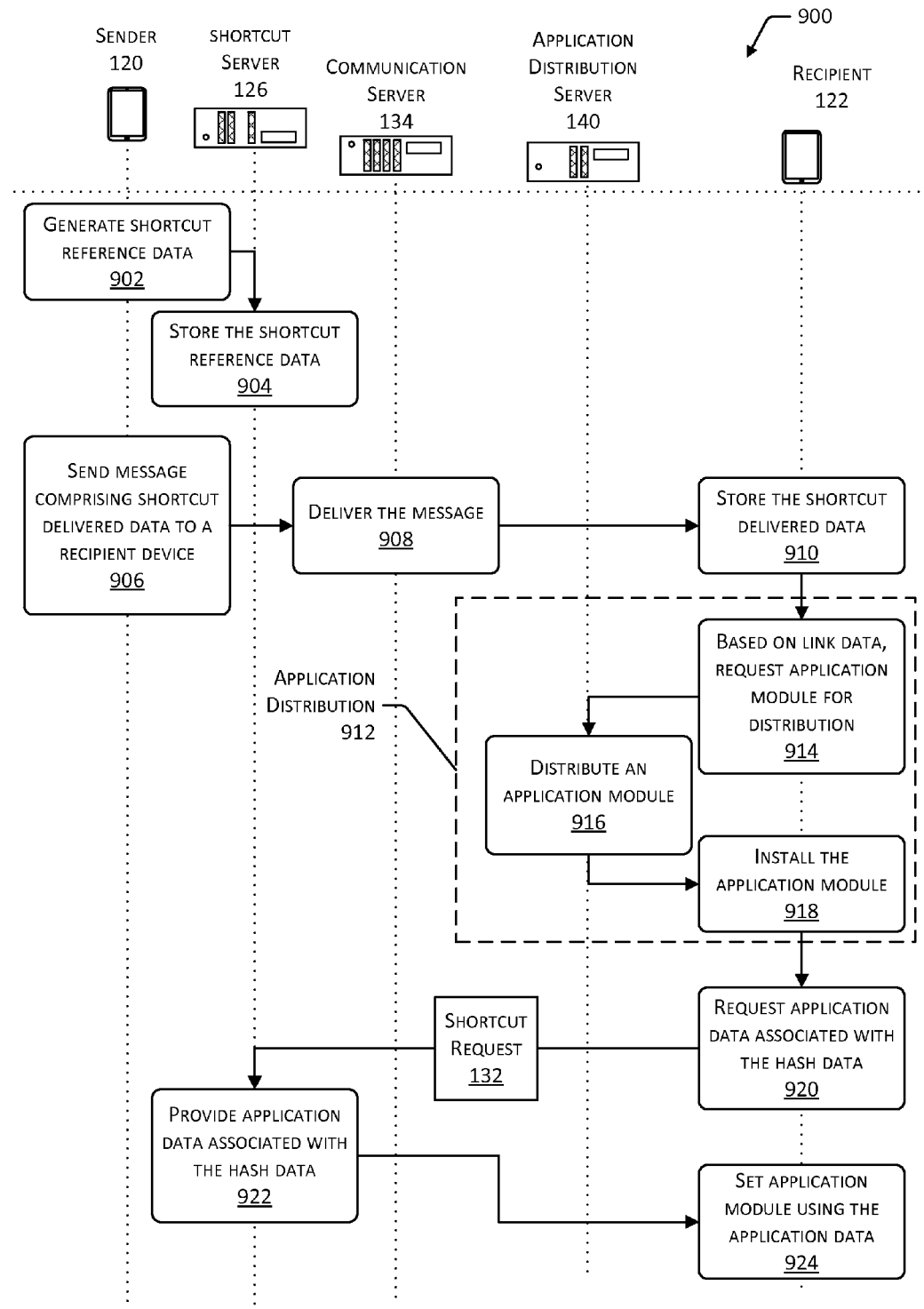
FIG. 9 depicts a flow diagram of sharing an application experience from a sending computing device to a recipient computing device.

FIG. 9 depicts a flow diagram 900 of sharing an application experience from the sender 120 to the recipient 122. Block 902 as executed on the sender 120 generates SRD 110 which is provided to the shortcut server 126. The shortcut server 126 is configured to store the SRD 110. For example, the shortcut processor module 128 may store at least a portion of the SRD 110 as the shortcut data 130.

After (or contemporaneously with) the generation of the SRD 110, block 906 as executed on the sender 120 sends a message comprising the SDD 146 to the recipient 122. For example, the message may comprise an SMS message, email, social network post, and so forth. In implementations where the message is delivered using the communication server 134, block 908 as executed on the communication server 134 delivers the message to the recipient 122.

Block 910 as executed on the recipient 122 stores the SDD 146. In the event the application module 106 associated with the SDD 146 is not installed or otherwise unavailable, the application distribution 912 process may proceed. The event the application module 106 associated with the SDD 146 is installed or otherwise available, the process may proceed to block 920.

The application distribution process 912 includes blocks 914 through 918. Block 914 as executed on the recipient 122 requests an application module 106 for distribution based on the link data 118. For example, the recipient 122 may use a URI in the link data 118 to connect to the application distribution server 140 and request distribution of the application module 106. Responsive to this request, block 916 as executed on the application distribution server 140 distributes the application module 106. Block 918 as executed on the recipient 122 installs the application module 106.

Block 920 as executed on the recipient 122 requests the application data 112 associated with the hash data 114 in the SDD 146. For example, the shortcut function module 108 of the recipient 122 may send the shortcut request 132 to the shortcut server 126. Block 922 as executed on the shortcut server 126 provides the application data 112 associated with the hash data 114 to the recipient 122. For example, the shortcut processor module 128 may retrieve the application data 112 using the hash data 114 as a key value for retrieval to uniquely identify the particular application data 112 associated with the shortcut.

Block 924 as executed on the recipient 122 receives the application data 112 from the shortcut server 126 and sets the application module 106 using the application data 112. For example, the application data 112 may overwrite or replace the current state of the application module 106 presently executing on the recipient 122.

FIG. 10 depicts a flow diagram 1000 of sharing an application experience from sender 120 to a recipient 122 using a manual input of the hash data 114 by a recipient user. As described elsewhere in this disclosure, in some implementations the operating system executing on the recipient 122 may implement one or more security constraints which prevent transfer of information between application modules executing on the same computing device 102. For example, each application module 106 may be placed within a sandbox or virtual machine which has limited communication capabilities. In another example, IPC communication or other mechanisms allowing for data transfer between application modules 106 executing on the computing device 102 may be prohibited. To provide the shortcut functionality described in this disclosure, as mentioned above with respect to FIG. 3 the shortcut function modules 108 may be incorporated into the application module 106 during compile time of the executable. As a result, the functions provided by the shortcut function modules 108 are within the same sandbox virtual machine and thus remain available for use. In the situation where data transfer between application modules 106 executing on the computing device 102 are unavailable, the user may be able to manually input the hash data 114 to the application module 106.

At 1002 a message is received which includes SDD 146 comprising the hash data 114. For example, an SMS message may be received by a messaging client module.

At 1004 the hash data 114 is presented with a first user interface 104(1) of a first application module. Continuing the example, the messaging client module may present the first user interface 104(1) which shows the message including the hash data 114 on the display device of the computing device 102.

At 1006 the hash data 114 is received with second user interface 104(2) of a second application, such as the application module 106. For example, the user may copy and paste the hash data 114 from the first application to the second application, or may remember and then manually enter the hash data 114.

At 1008 the application data 112 associated with the hash data 114 is received from the shortcut server 126. For example, the recipient 122 may send a shortcut request 132 to the shortcut server 126 and receives the application data 112 in response.

At 1010, following the receipt of the application data 112, the second application is configured using the application data 112. Continuing the example, the application data 112 may replace the current state of the application module 106.

In another example, such as where the application data 112 includes the screenshot 204, the screenshot 204 may be presented on the display device of the computing device 102.

Figure 11:
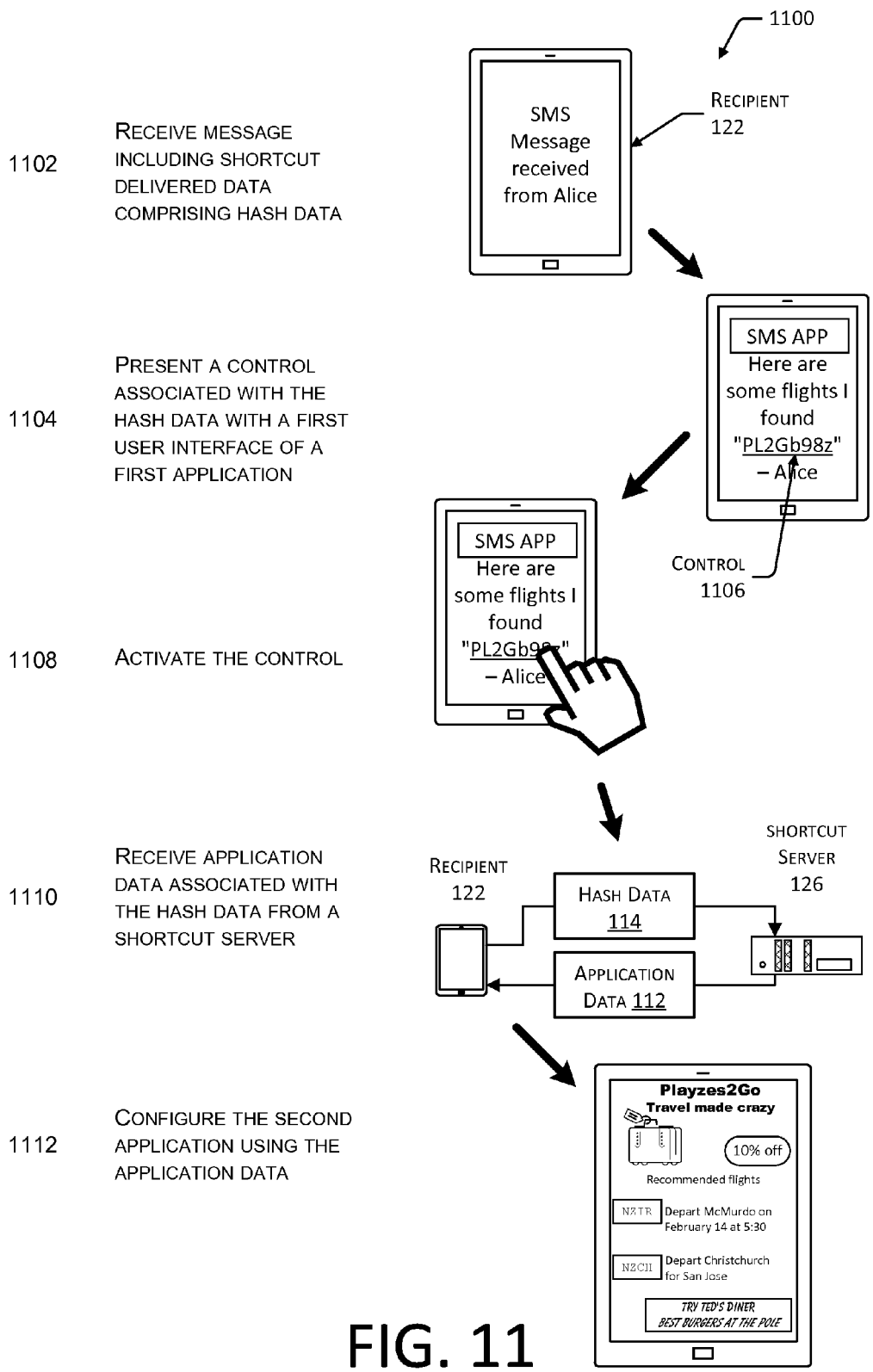
FIG. 11 depicts a flow diagram of sharing an application experience from a sending computing device to a recipient computing device using automatic transfer of the hash data to an application module.

FIG. 11 depicts a flow diagram 1100 of sharing an application experience from a sender 120 to a recipient 122 with the hash data 114 provided to the application module 106 or the shortcut handler module 150 automatically, or upon command by the recipient user. For example, this process may use IPC communication or other mechanisms to transfer data between application modules 106 executing on the computing device 102.

At 1102 a message is received which includes SDD 146 comprising the hash data 114. For example, an SMS message may be received by a messaging client module.

At 1104 a control 1106 associated with the hash data 114 is presented with a first user interface of a first application module. Continuing the example, the messaging client module may present the first user interface 104(1) which shows the message and the control 1106. In some implementations the hash data 114, or an indication associated with the hash data 114 such as a particular icon, may be presented on the display device indicating availability of a shortcut. In this illustration, the control 1106 is presented as a zone on the display associated with the hash data 114.

In some implementations, the control 1106 may be omitted, or preconfigured. In a first implementation, the SDD 146 may be processed automatically without receiving user input or confirmation. For example, all incoming SDD 146 may be processed by the shortcut function modules 108. In a second implementation, processing of the SDD 146 may incorporate rules. The rules may designate one or more of: a particular sender identifier 602, particular application module 106, date/time, message delivery mechanism (e.g., SMS, email, instant message, social network post, etc.), or other. For example, the rules may specify that SDD 146 sent by a particular sender identifier 602, such as associated with the recipient user's parent, may be automatically processed, while other SDD's 146 sent by other senders 120 (such as determined by device identifier, user identifier, or both) result in a prompt for manual approval.

At 1108 the control 1106 is activated. For example, the user may touch the control 1106, enter a verbal command which is recognized by speech recognition module, or provide other input which activates the control 1106.

At 1110 the application data 112 associated with the hash data 114 is received from the shortcut server 126. For example, the recipient 122 may send a shortcut request 132 to the shortcut server 126 and receives the application data 112 in response.

At 1112, following the receipt of the application data 112, the second application module is configured using the application data 112. Continuing the example, the application data 112 may replace the current state of the application module 106. In another example, such as where the application data 112 includes the screenshot 204, the screenshot 204 may be presented on a display device.

Figure 12:
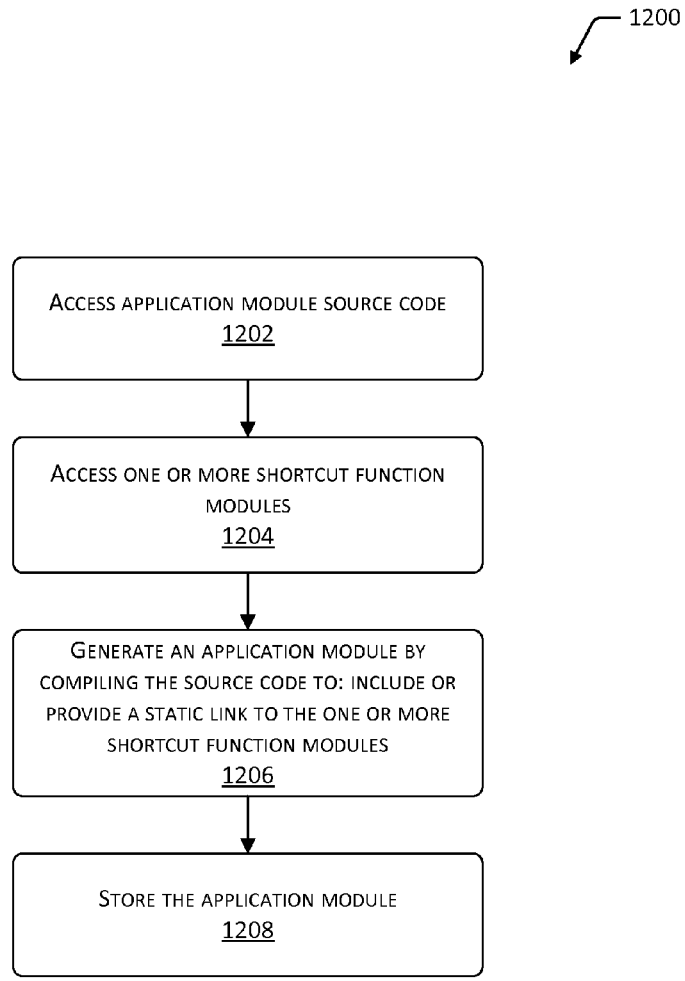
FIG. 12 depicts a flow diagram of a process of incorporating, at compile time, one or more shortcut function modules into an application module.

FIG. 12 depicts a flow diagram 1200 of a process of incorporating, at compile time, one or more shortcut function modules 108 into the application module source code 302. The process may be implemented at least in part by a computing device 102.

Block 1202 accesses the application module source code 302. For example, the compiler 304 may open the application module source code 302 as stored in the memory 410.

Block 1204 accesses one or more shortcut function modules 108. For example, the compiler 304 may open the shortcut function modules 108 as stored in the memory 410.

Block 1206 generates the application module 106 with integrated shortcut function modules 108. In one implementation, the generation may comprise compiling the source code 302 and including one or more static links to the one or more shortcut function modules 108. In another implementation, the generation may comprise including the shortcut function modules 108 into the code of the application module source code 302 and compiling this combined source code.

Figure 13:
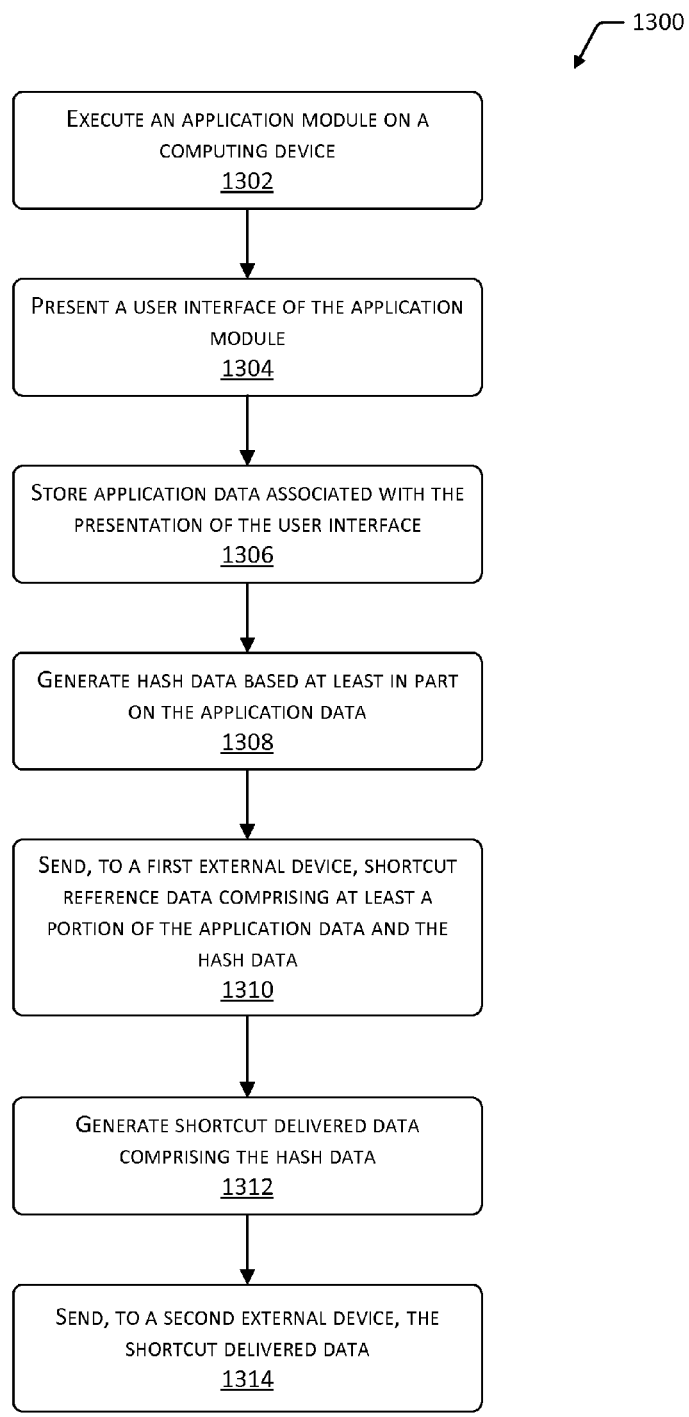
FIG. 13 depicts a flow diagram of a process of generating shortcut reference data at a sending computing device.

FIG. 13 depicts a flow diagram 1300 of a process of generating SRD 110 at sender 120. The process may be implemented at least in part by the shortcut function modules 108.

Block 1302 executes an application module 106 on a computing device 102. For example, a user may initiate execution of the application module 106. In one implementation, the application module 106 may comprises one or more of: a shortcut function module 108 incorporated at compilation of the application module source code 302, or a link to a static library incorporated at compilation of the application module source code 302. In another implementation, the application module 148 may operate in conjunction with a shortcut handler module 150 which may include one or more of the shortcut function modules 108.

Block 1304 presents a user interface 104 of the application module 106. In some implementations, the user interface 104 may be based at least in part on the application data 112. In some implementations this block may be omitted. For example, the application module 106 may be "headless" such that it does not provide the user interface 104 to the user, but instead may provide information which is used by another application module which may provide the user interface 104.

Block 1306 stores application data 112 of the application module 106. In some implementations, the application data 112 may be associated with the presentation of the user interface 104. For example, the application data 112 may include information which includes what is presented within the user interface 104 as well as state data 202 which has configured the application module 106 to arrive at the state which is represented by the user interface 104.

Block 1308 generates hash data 114 comprising a hash value 220. The hash value 220 may be based at least in part on applying a hash function to at least a portion of the application data 112. The hash data 114 may also comprise the application identifier 218 indicative of the application module 106 which is associated with the generation, or use of, the shortcut. In some implementations the process may determine the application identifier 218 indicative of the application module. For example, the shortcut function module 108 may retrieve an application identifier 218 from the application module 106.

In some implementations, the application module 106(1) of the sender 120 and the application module 106(2) of the recipient 122 may differ. For example, the application module 106(1) may be compiled for execution on an Android® device while the application module 106(2) may be compiled for execution on an iOS® device. In another example, the application modules 106(1) and 106(2) of the sender 120 and the recipient 122 may be provided by different entities, provide different sets of functions, and so forth. However, the shortcut function modules 108 used by both the sender 120 and the recipient 122 are configured to operate on the application data 112 such that the application experience provided to the user is consistent.

Furthermore, in some implementations the shortcut processor module 128 may be configured to translate the application data 112 provided by the sender 120 into a form which is suitable for use by the recipient 122. For example, state information may be converted from an integer object as used on the sender 120 to a string object as used on the recipient 122.

In some implementations the process may include performing one or more operations on the SRD 110. The operations may include one or more of: encrypting at least a portion of the application data 112, compressing at least a portion of the application data 112, preventing generation of duplicate SRD 110, and so forth.

Block 1310 sends, to a first external device, the SRD 110 comprising at least a portion of the application data 112 and the hash data 114. For example, the first external device may comprise the shortcut server 126.

Block 1312 generates the SDD 146. The SDD 146 comprises the hash data 114 and may also comprise the link data 118. The link data 118 may comprise a URI indicative of a network location from which installation of the application module 106 or 148 may be initiated.

Block 1314 sends, to a second external device, the SDD 146. For example, the second external device may comprise the recipient 122, or the communication server 134 which will deliver the SDD 146 to the recipient 122. The sending of the SDD 146 may include one or more of transmitting an SMS message comprising the SDD 146, transmitting an email message comprising the SDD 146, posting a file comprising the SDD 146 to a web server, and so forth.

In some implementations, a block (not illustrated) may receive, at a user input device, an input. For example, the user may touch a touch sensor, speak verbal input which is acquired by a microphone, and so forth. The sending of the SDD 146 to the second external device may be responsive to receiving the input. Continuing the example, the input may initiate sending the shortcut. In some implementations, the input may also trigger presentation of the user interface 104 configured to accept information designating the recipient 122.

Figure 14:
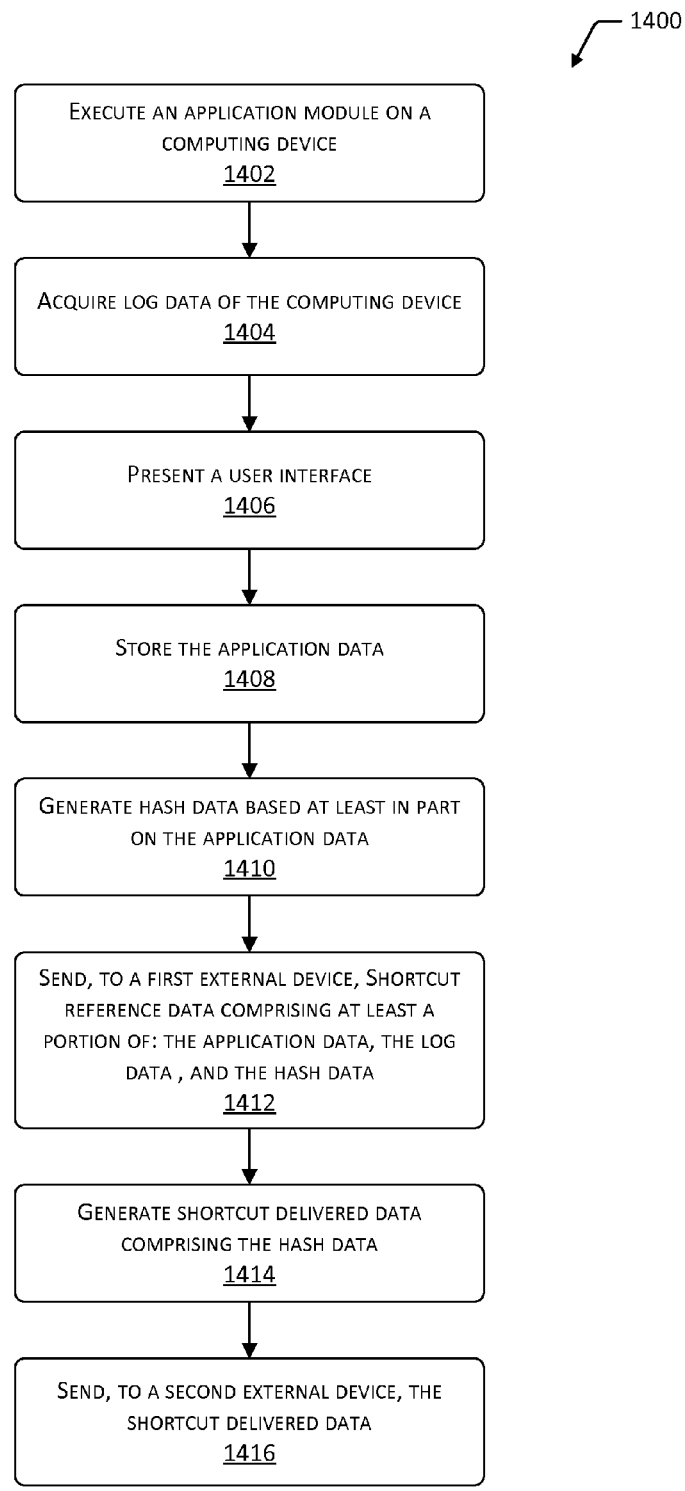
FIG. 14 depicts a flow diagram of a process of generating shortcut reference data which includes log data at a sending computing device.

FIG. 14 depicts a flow diagram 1400 of a process of generating the SRD 110 which includes log data 116. As described elsewhere in this application, in some implementations the shortcut may be used to assist in technical or operational support of the application module 106. For example, using the process described in this figure the sender 120 may provide the recipient 122 information associated with an application error, failure, or other unexpected or undesired operation of the application module 106. Support personnel at a helpdesk may use the recipient 122 to assist in troubleshooting the unexpected or undesired operation. The process may be implemented at least in part by the shortcut function modules 108.

Block 1402 executes an application module 106 on a computing device 102. For example, the application module 106 may be automatically executed on startup of the computing device 102. In one implementation, the application module 106 may comprise one or more of: a shortcut function module 108 incorporated at compilation of the application module source code 302, or a link to a static library incorporated at compilation of the application module source code 302. In another implementation, the application module 148 may operate in conjunction with a shortcut handler module 150 which may include one or more of the shortcut function modules 108.

Block 1404 requires the log data 116 of the computing device 102. For example, the shortcut function modules 108 may retrieve information from the OS module 412.

Block 1406 presents a user interface 104 of the application module 106. In some implementations, the user interface 104 may be based at least in part on the application data 112.

Block 1408 stores application data 112 of the application module 106. In some implementations, the application data 112 may be associated with the presentation of the user interface 104. For example, the application data 112 may include information which includes what is presented within the user interface 104 as well as state data 202 which has configured the application module 106 to arrive at the state which is represented by the user interface 104, screenshots 204, and so forth.

Block 1410 generates hash data 114 comprising a hash value 220. The hash value 220 may be based at least in part on applying a hash function to at least a portion of the application data 112. The hash data 114 may also comprise the application identifier 218 indicative of the application module 106 which is associated with the generation, or use of, the shortcut. In some implementations the process may determine the application identifier 218 indicative of the application module 106. For example, the shortcut function module 108 may retrieve an application identifier 218 from the application module 106.

As described above, in some implementations, the application module 106(1) of the sender 120 and the application module 106(2) of the recipient 122 may differ. However, the shortcut function modules 108 used by both the sender 120 and the recipient 122 are configured to operate on the application data 112 such that the application experience provided to the user is consistent.

In some implementations the process may include performing one or more operations on the SRD 110. The operations may include one or more of: encrypting at least a portion of the application data 112, compressing at least a portion of the application data 112, preventing generation of duplicate SRD 110, and so forth.

Block 1412 sends, to a first external device, the SRD 110 comprising at least a portion of the application data 112 and the hash data 114. For example, the first external device may comprise the shortcut server 126.

Block 1414 generates the SDD 146. The SDD 146 comprises the hash data 114 and may also comprise the link data 118. The link data 118 may comprises a URI indicative of a network location from which installation of the application module 106 or 148 may be initiated.

Block 1416 sends, to a second external device, the SDD 146. For example, the second external device may comprise the recipient 122, or the communication server 134 which will deliver the SDD 146 to the recipient 122. The sending of the SDD 146 may include one or more of transmitting an SMS message comprising the SDD 146, transmitting an email message comprising the SDD 146, posting a file comprising the SDD 146 to a web server, and so forth.

In some implementations, a block (not illustrated) may receive, at a user input device of the computing device 102, an input. For example, the user may touch a touch sensor, speak verbal input which is acquired by a microphone, and so forth. The sending of the SDD 146 to the second external device may be responsive to receiving the input. Continuing the example, the input may initiate sending the shortcut. In some implementations, the input may also trigger presentation of the user interface configured to accept information designating the recipient 122.

Figure 15:
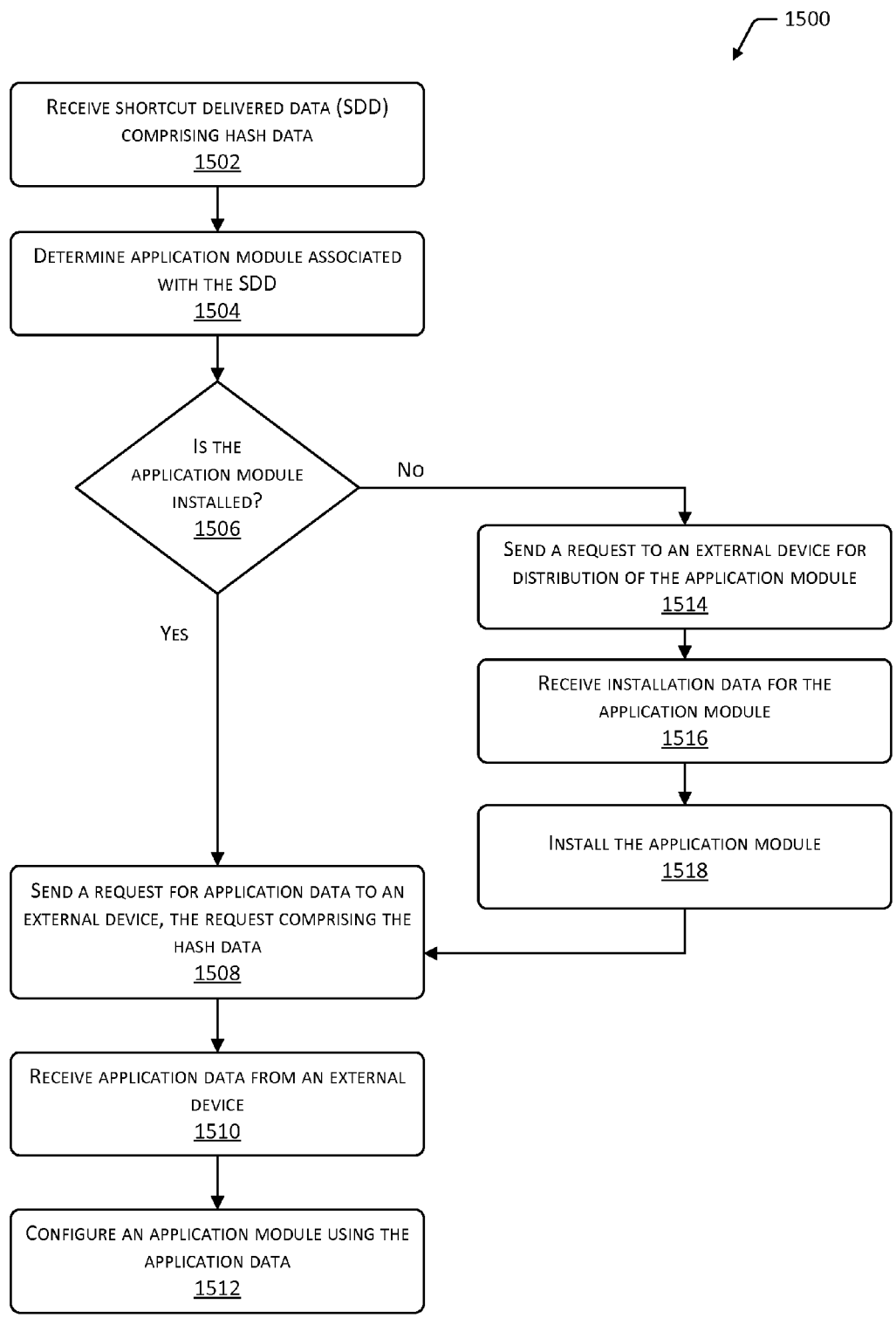
FIG. 15 depicts a flow diagram of a process of processing shortcut delivered data at a recipient device.

FIG. 15 depicts a flow diagram 1500 of a process of processing SDD 146 at a recipient 122 device. The process may be implemented at least in part by the shortcut function modules 108 executing on the recipient 122.

Block 1502 receives, using the communication interface 408, shortcut SDD 146 comprising the hash data 114. The hash data 114 includes a hash value 220 and may also include an application identifier 218. The hash value 220 may be based at least in a part on applying one or more hashing functions to data indicative of one or more of: a device identifier of a sending device 120, an application identifier 218 of an application module 106 executing on the sending device 120, application data 112 indicative of a state of the application module 106 on the sending device 120, a user identifier of a user associated with the sending device 120, and so forth.

Block 1504 determines an application module 106 associated with the SDD 146. In one implementation this determination may include comparing the application identifier 218 with information stored in the memory 410. The information may be configured to associate a particular application identifier 218 with a particular application module 106. For example a look up table may store the information indicating the application identifier 218(1) "PL2G" refers to the "Playzes2Go" travel application, while the application identifiers 218(2) "BOBO" refers to the "FlyMeAway" aircraft charter application.

When block 1506 determines the application module 106 associated with the SDD 146 is installed and directs the process to block 1508. Block 1508 sends, using the communication interface 408, a request for application data 112 to an external device. For example, the shortcut request 132 may be sent to the shortcut server 126. As described above, the request may comprise the hash data 114.

Block 1510 receives, using the communication interface 408, application data 112 from the external device. For example, the shortcut server 126 may return the application data 112. The application data 112 may comprise one or more of: information state data 202 indicative of a state of the application module 106 as executed at least in part by a sending device 120, or a screenshot 204 acquired during presentation of a user interface 104 on the sending device 120. As described above, the user interface 104 may be a GUI, CUI, audible user interface, or haptic user interface.

Block 1512 configures the application module 106 using the application data 112. For example, the shortcut function modules 108 may load the application data 112 into one or more memory locations used by the application module 106.

Returning to block 1506, when the application module 106 associated with the SDD 146 is determined to not be installed the process proceeds to block 1514. Block 1514 sends a request to an external device for distribution of the application module 106. In a first implementation the SDD 146 may comprise the link data 118. In a second implementation, the link data 118 may be provided to the recipient 122 responsive to providing the hash data 114. The request for distribution of the application module 106 may comprise utilization of the link data 118. For example, the shortcut function modules 108 may open the URI of the link data 118 to establish a connection. Continuing the example, the URI may be opened using an application installation application module, such as an application configured to access the application store.

Block 1516 receives installation data for the application module 106. For example, the installation data may comprise further URIs or other information used to install the application module 106 on the recipient 122. Block 1518 installs the application module 106.

In some implementations, installation of the application module 106 may be responsive to user acceptance of a prompt provided in a user interface 104. For example, the user interface 104 may present the user with the option "install this application?" An affirmative response may permit the installation.

Figure 16:
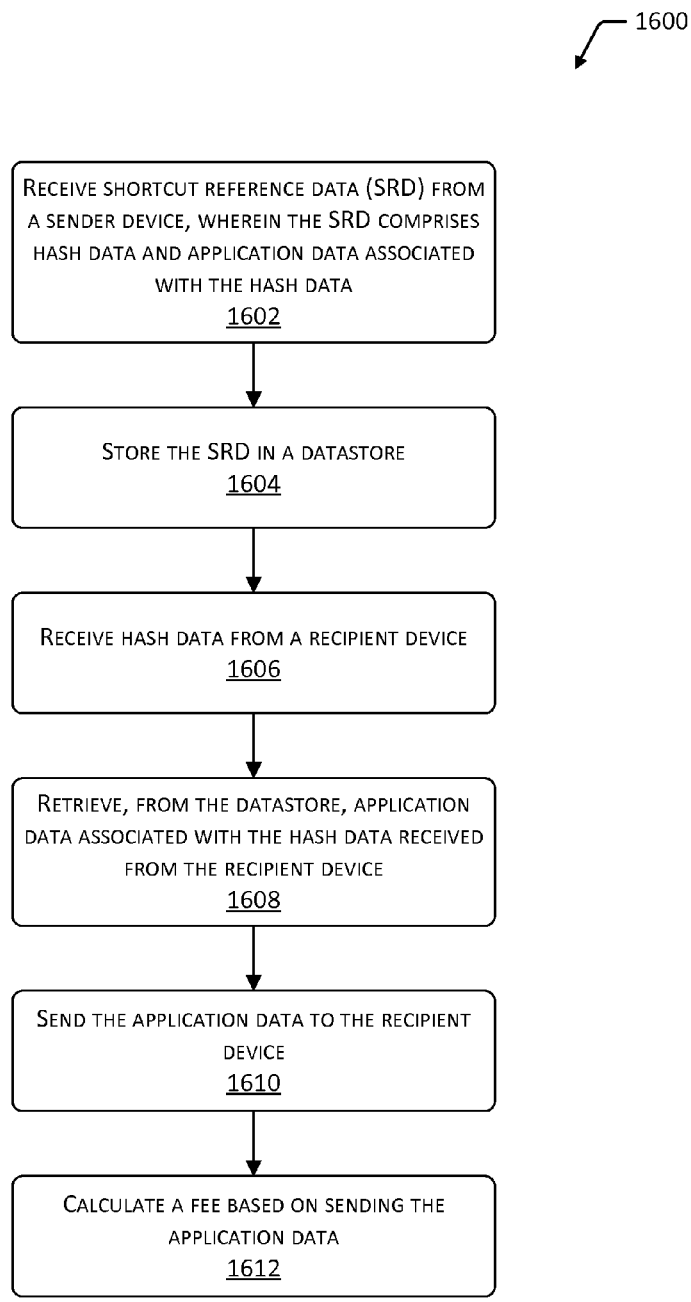
FIG. 16 depicts a flow diagram of a process of processing shortcut reference data at a shortcut server.

FIG. 16 depicts a flow diagram 1600 of a process of processing the SRD 110 at the shortcut server 126. The process may be implemented at least in part by the shortcut processor module 128 executing on the shortcut server 126.

Block 1602 receives SRD 110 from a sender 120 device. The SRD 110 includes application data 112, and may also include hash data 114 which is associated with the application data 112.

Block 1604 stores at least a portion of the SRD 110 in a datastore 524. For example, the application data 112 and the hash data 114 may be stored in the shortcut data 130. In some implementations the SRD 110 may further comprise the log data 116. The log data may comprise one or more of: UIView data of an application module 106 executed at least in part by the sender device 120, UIWebView data of the application module 106 executed at least in part by the sender device 120, network data, or other information. The network data may include information indicative of traffic sent, received, or sent and received by a communication interface 408 of the sender device 120.

Block 1606 receives hash data 114 from a recipient 122 device. For example, the shortcut function module 108 executing on the recipient 122 may send a shortcut request 132.

Block 1608 retrieves the application data 112 from the datastore 524 using the hash data 114 which was received from the recipient device 122. For example the hash data 114 may be used as the search term to retrieve the associated application data 112 stored in the shortcut data 130.

Block 1610 sends the application data 112 to the recipient device 122. The application data 112 may comprise information indicative of a state of an application module 106 (such as state data 202) as executed at least in part by the sender device 120, one or more screenshots 204 acquired during presentation of a user interface 104 on the sender device 120, or both. In some implementations the application data 112 may be expressed as a string.

Block 1612 calculates a fee based at least in part on the sending the application data 112 to the recipient device 122. In one implementation a fee may be assessed for each time the application data 112 is provided to the recipient device 122. The fee may be assessed to an account associated with the recipient 122, or to a third-party, such the software developer or software distributor.

Figure 17:
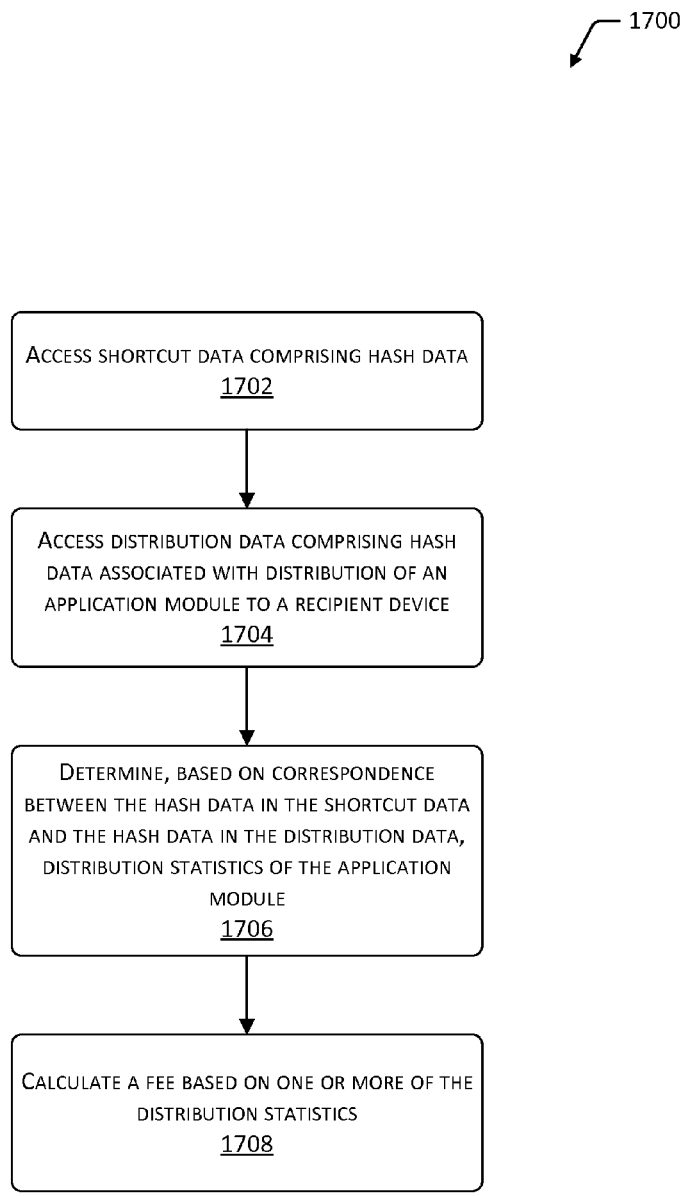
FIG. 17 depicts a flow diagram of a process of calculating a fee for distribution of applications associated with use of shortcut delivered data.

FIG. 17 depicts a flow diagram 1700 of a process of calculating a fee for distribution of application modules 106 associated with use of the SDD 146. The process may be implemented at least in part by one or more of the computing device 102, shortcut server 126, the communication server 134, or the application distribution server 140.

Block 1702 accesses the shortcut data 130. Shortcut data 130 may be based at least in part on the SRD 110. The SRD 110 may include the hash data 114.

Block 1704 accesses the distribution data 144. In some implementations the distribution data 144 may comprise the hash data 114 associated with distribution of an application module 106 to a recipient device 122.

Block 1706 determines, based on correspondence between the hash data 114 in the shortcut data 130 and the hash data 114 of the distribution data 144, one or more distribution statistics of the application module 106. For example, the hash data 114 which appears in both the shortcut data 130 and the distribution data 144 may be used as a common key to determine what distributions were associated with shortcuts. The distribution statistics may include, but are not limited to, quantity of distributions of the application module 106, sales associated with the distributed application module 106, and so forth.

Block 1708 calculates a fee based on one or more of the distribution statistics. For example, the software developer of the application module 106 may be assessed a fee of $1.00 per distributions which resulted from the shortcut.

Figure 18:
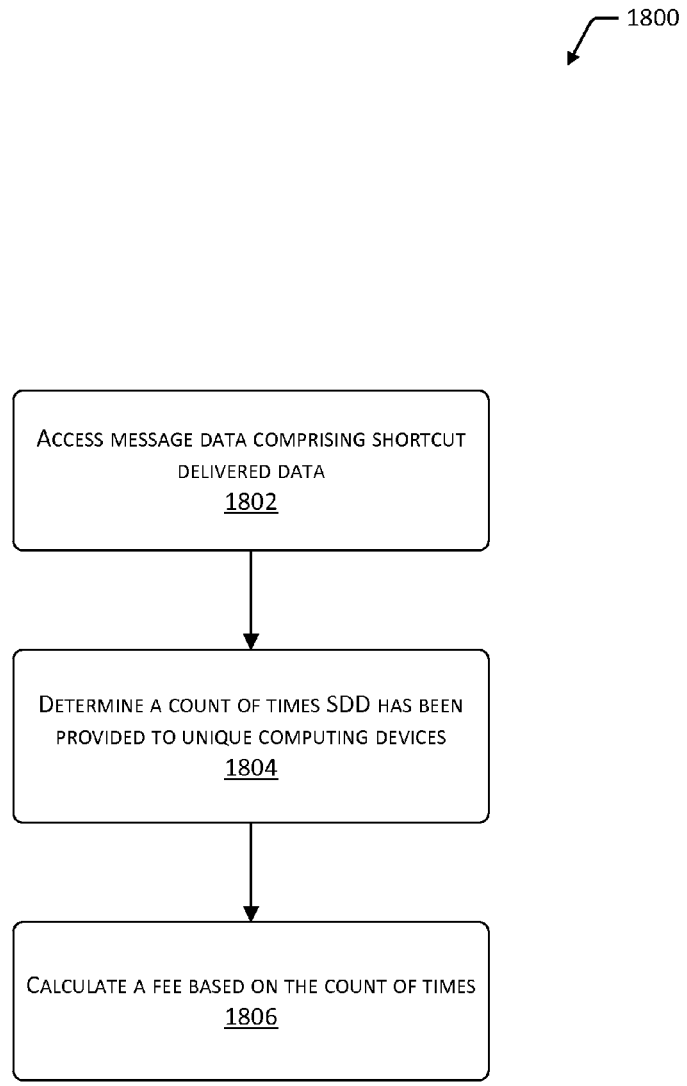
FIG. 18 depicts a flow diagram of a process of calculating a fee for distribution of hash data associated with shortcut delivered data.

FIG. 18 depicts a flow diagram 1800 of a process of calculating a fee for distribution of hash data 114 associated with the SDD 146. The process may be implemented at least in part by one or more of the computing device 102, shortcut server 126, the communication server 134, or the application distribution server 140.

Block 1802 accesses message data 138. The message data 138 may comprise SDD 146 and information about access to the SDD 146.

Block 1804 determines a count of times the SDD 146 has been provided to unique computing devices 102. For example, the sender 120 may post the SRD 110 to a social networking website. Continuing the example, fifty users may download the SRD 110. Ten of those users may use the SDD 146 to send shortcut requests 132. The count of times would reflect the fifty downloads.

Block 1806 calculates a fee based at least in part on the count of times. For example, the fee may be $0.01 assessed each time the SDD 146 is downloaded and regardless of use. Continuing the example above, the fee assessed would be 50×$0.01 or $0.50.

The fee assessments as described in this disclosure may be used in combination with one another. In other implementations, other fees may be assessed with the usage or performance of the system 100.

The phrases "configured to" and "operable to" is used in this disclosure may indicate one or more computer executable instructions stored in CRSM which are executable on one or more hardware processors.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A system comprising:
a processor;
a communication interface coupled to the processor; and
a memory coupled to the processor and storing instructions configured for execution on the processor, the instructions configured to:
receive, using the communication interface, shortcut delivered data (SDD) comprising hash data;
determine an application module associated with the SDD;
send, using the communication interface, a request for application data to an external device wherein the request comprises the hash data;
receive, using the communication interface, application data from the external device; and
configure the application module using the application data.

2. The system of claim 1, wherein the hash data comprises an application identifier and a hash value, and further wherein the hash value is based at least in a part on applying one or more hashing functions to data indicative of one or more of:
a device identifier of a sending device,
an application identifier of an application module executing on the sending device,
application data indicative of a state of the application module on the sending device, or
a user identifier of a user associated with the sending device.

3. The system of claim 2, wherein:
the determining the application module associated with the SDD comprises comparing the application identifier with information stored in the memory, the information configured to associate a particular application identifier with a particular application module.

4. The system of claim 1, wherein the application data comprises one or more of:
information indicative of a state of an application module as executed at least in part by a sending device, or a screenshot acquired during presentation of a graphical user interface on the sending device.

5. The system of claim 1, the instructions further configured to, before configuring the application module using the application data:
   determine the application module associated with the SDD is not installed on the system;
   send, using the communication interface, a request for distribution of the application module;
   receive, using the communication interface, installation data for the application module; and
   install the application module to the system.

6. The system of claim 1, wherein:
   the SDD further comprises link data, the link data indicative of a uniform resource identifier; and
   the sending the request for distribution comprises establishing a connection using the link data.

7. The system of claim 1, further comprising:
   one or more output devices coupled to the processor, wherein the one or more output devices comprise a display, a speaker, or both a display and a speaker;
   one or more input devices coupled to the processor, wherein the one or more input devices comprise one or more of: a button, a keyboard, a touch sensor, a motion sensor, or a camera; and
   the instructions further configured to:
      present at least a portion of the hash data using the one or more output devices in a first user interface of a second application module;
      receive input comprising the hash data using the one or more input devices in a second user interface of the application module.

8. A computer-implemented method, the method comprising:
   executing an application module on a computing device;
   presenting a user interface of the application module;
   storing application data associated with the presenting of the user interface;
   generating hash data comprising a hash value, the hash value based at least in part on applying a hash function to at least a portion of the application data; and
   sending, to an external device, shortcut reference data (SRD) comprising at least a portion of the application data and the hash data.

9. The method of claim 8, wherein the application module comprises one or more of: a shortcut function module incorporated at compilation of the application module, or a link to a static library incorporated at compilation of the application module.

10. The method of claim 8, the hash data further comprising an application identifier indicative of the application module.

11. The method of claim 8, further comprising:
   performing one or more operations on the SRD, the operations comprising encrypting at least a portion of the application data, or compressing at least a portion of the application data.

12. The method of claim 8, further comprising:
   generating shortcut delivered data (SDD) comprising the hash data and link data, wherein the link data comprises a uniform resource identifier indicative of a network location from which installation of the application module may be initiated; and
   sending the SDD to a second external device.

13. The method of claim 12, wherein the sending the SDD to the second external device comprises one or more of:
   transmitting a short message service (SMS) message comprising the SDD,
   transmitting an email message comprising the SDD, or
   posting a file comprising the SDD to a web server.

14. The method of claim 12, further comprising:
   receiving, at a user input device, an input; and
   wherein the sending the SDD to the second external device is responsive to the receiving the input.

15. The method of claim 8, wherein the application data comprises one or more of:
   state data associated with execution of the application module as executed at least in part by the computing device, or
   one or more screenshots, the screenshots comprising images of a graphical output by the computing device; and
   the method further comprising:
   acquiring log data of the computing device, wherein the log data comprises one or more of:
   UIView data of the application module,
   UIWebView data of the application module, or
   network data indicative of traffic sent, received, or sent and received by a communication interface of the computing device; and
   wherein the SRD for sending to the external device further comprises the log data.

16. A computer-implemented method, the method comprising:
   receiving shortcut reference data (SRD) from a sender device, wherein the SRD comprises hash data and application data associated with the hash data;
   storing the SRD in a datastore;
   receiving hash data from a recipient device;
   retrieving the application data from the datastore using the hash data received from the recipient device; and
   sending the application data to the recipient device.

17. The method of claim 16, wherein the application data comprises one or more of:
   information indicative of a state of an application module as executed at least in part by the sender device, or
   a screenshot acquired during presentation of a user interface on the sender device; and
   further wherein the application data is expressed as a string.

18. The method of claim 16, further comprising:
   calculating a fee based on the sending the application data to the recipient device.

19. The method of claim 16, further comprising:
   accessing distribution data comprising hash data associated with distribution of an application module to the recipient device;
   determining, based on correspondence between the hash data of the SRD and the hash data of with the distribution data, distribution statistics of the application module, wherein the distribution statistics comprise one or more of:
   quantity of distributions of the application module,
   sales associated with the distributed application module; and
   calculating a fee based on one or more of the distribution statistics.

20. The method of claim 16, wherein the SRD further comprises log data, the log data comprising one or more of:
   UIView data of an application module executed at least in part by the sender device, UIWebView data of the application module executed at least in part by the sender device, or network data indicative of traffic sent, received, or sent and received by a communication interface of the sender device.

* * * * *